(12) United States Patent
Xu et al.

(10) Patent No.: US 12,506,658 B2
(45) Date of Patent: Dec. 23, 2025

(54) ACCESS NETWORK MANAGEMENT CONFIGURATION METHOD, SYSTEM, AND APPARATUS

(71) Applicant: HUAWEI TECHNOLOGIES CO., LTD., Shenzhen (CN)

(72) Inventors: Ruiyue Xu, Shanghai (CN); Kai Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 398 days.

(21) Appl. No.: 18/163,897

(22) Filed: Feb. 3, 2023

(65) Prior Publication Data

US 2023/0179482 A1    Jun. 8, 2023

Related U.S. Application Data

(63) Continuation of application No. PCT/CN2020/107566, filed on Aug. 6, 2020.

(51) Int. Cl.
| | |
|---|---|
| H04L 41/0853 | (2022.01) |
| H04W 48/16 | (2009.01) |
| H04W 48/18 | (2009.01) |

(52) U.S. Cl.
CPC ......... H04L 41/0853 (2013.01); H04W 48/16 (2013.01); H04W 48/18 (2013.01)

(58) Field of Classification Search
CPC .................................................. H04L 41/0853
USPC ....................................................... 455/414.1
See application file for complete search history.

(56) References Cited

U.S. PATENT DOCUMENTS

| | | | | |
|---|---|---|---|---|
| 6,151,309 A | * | 11/2000 | Busuioc | H04W 4/24 |
| | | | | 455/452.2 |
| 2004/0053630 A1 | * | 3/2004 | Ramos | H04W 16/14 |
| | | | | 455/500 |
| 2009/0019536 A1 | * | 1/2009 | Green | H04L 41/0853 |
| | | | | 709/221 |

(Continued)

FOREIGN PATENT DOCUMENTS

| | | |
|---|---|---|
| CN | 107810623 A | 3/2018 |
| CN | 109429274 A | 3/2019 |

(Continued)

OTHER PUBLICATIONS

Extended European Search Report issued in corresponding European Application No. 20948287.6, dated Aug. 22, 2023, pp. 1-9.

(Continued)

*Primary Examiner* — Qutbuddin Ghulamali
(74) *Attorney, Agent, or Firm* — HAUPTMAN HAM, LLP

(57) ABSTRACT

In an access network management configuration method, a first identifier of a first operator and first management configuration information of an access network management object of the first operator are obtained, a second identifier of a second operator and second management configuration information of the access network management object of the second operator are obtained, and, based on the first management configuration information and the second management configuration information, a first operator management instance corresponding to the first operator and a second operator management instance corresponding to the second operator are created in the access network management object.

20 Claims, 11 Drawing Sheets

(56) References Cited

U.S. PATENT DOCUMENTS

| | | | | |
|---|---|---|---|---|
| 2011/0182209 | A1* | 7/2011 | De Ponti | H04L 41/0846 370/257 |
| 2013/0244675 | A1* | 9/2013 | Picker | H04W 88/10 455/450 |
| 2019/0045351 | A1* | 2/2019 | Zee | H04W 76/11 |
| 2019/0260741 | A1* | 8/2019 | Ashok | H04L 63/083 |
| 2021/0219146 | A1* | 7/2021 | Xu | H04W 16/18 |
| 2021/0219192 | A1* | 7/2021 | Xu | H04W 24/02 |

FOREIGN PATENT DOCUMENTS

| | | | |
|---|---|---|---|
| CN | 109525409 A | 3/2019 | |
| EP | 3843444 A1 | 6/2021 | |
| WO | 2018089634 A1 | 5/2018 | |
| WO | 2020063872 A1 | 4/2020 | |

OTHER PUBLICATIONS

3GPP TS 38.300 V16.2.0 (Jul. 2020), 3rd Generation Partnership Project; Technical Specification Group Radio Access Network; NR; NR and NG-RAN Overall Description; Stage 2(Release 16), 148 pages.

3GPP TS 32.130 V16.0.0 (Jul. 2020), 3rd Generation Partnership Project; Technical Specification Group Services and System Aspects; Telecommunication management; Network sharing;Concepts and requirements (Release 16), 17 pages.

3GPP TS 23.501 V16.5.1 (Aug. 2020), 3rd Generation Partnership Project; Technical Specification Group Services and System Aspects; System architecture for the 5G System (5GS); Stage 2(Release 16), 440 pages.

3GPP TS 28.541 V16.5.0 (Jun. 2020), 3rd Generation Partnership Project; Technical Specification Group Services and SystemAspects; Management and orchestration; 5G Network Resource Model (NRM); Stage 2 and stage 3(Release 16), 403 pages.

3GPP TS 28.622 V16.4.0 (Jul. 2020), 3rd Generation Partnership Project; Technical Specification Group Services and System Aspects; Telecommunication management; Generic Network Resource Model (NRM) Integration Reference Point (IRP); Information Service (IS)(Release 16), 54 pages.

3GPP TS 32.101 V16.0.0 (Jul. 2020), 3rd Generation Partnership Project; Technical Specification Group Services and System Aspects; Telecommunication management; Principles and high level requirements(Release 16), 68 pages.

International Search Report issued in corresponding International Application No. PCT/CN2020/107566, dated May 7, 2021, 8 pages.

India Hearing Notice issued in corresponding India Application No. 202317009500, dated Feb. 21, 2025, pp. 1-2.

* cited by examiner

ACCESS NETWORK MANAGEMENT CONFIGURATION METHOD, SYSTEM, AND APPARATUS

CROSS-REFERENCE TO RELATED APPLICATIONS

This application is a continuation of International Application No. PCT/CN2020/107566, filed on Aug. 6, 2020, the disclosure of which is hereby incorporated by reference in its entirety.

TECHNICAL FIELD

This application relates to the communications field, and in particular, to an access network management configuration method, a system, and an apparatus.

BACKGROUND

With the acceleration of mobile communication network construction, operators consider sharing a radio access network RAN to complete network construction quickly and cost-effectively. In a spectrum sharing scenario, a plurality of operators share a same RAN device and a same cell, and the plurality of operators may include a primary operator, at least one secondary operator, and the like. In an existing network operation and maintenance scenario, the primary operator performs operation and maintenance on the shared RAN device and cell. Resources, services, or features of all operators on a RAN are the same.

To meet different network requirements of vertical industries, a non-public network (non-public network, NPN) is introduced. The NPN is specially used by a private entity, for example, an enterprise. The NPN may be deployed in the following two forms: a completely standalone non-public network (standalone non-public network, SNPN) and a public network integrated non-public network (or referred to as a non-standalone NPN) (public network integrated NPN, PNI-NPN). In the two deployment forms, an operator and an enterprise share a same RAN device and cell. The operator or the enterprise can perform operation and maintenance on the shared RAN device and cell. Resources, services, or features of the operator are the same as those of the enterprise.

An existing network operation and maintenance method cannot meet differentiated requirements between different operators or between an operator and an enterprise.

SUMMARY

Embodiments of this application provide an access network management configuration method, a system, and an apparatus, to create differentiated management instances of a plurality of operators or enterprises in a same access network management object, to improve flexibility of network configuration.

To achieve the foregoing objective, this application uses the following technical solutions.

According to a first aspect, an access network management configuration method is provided. The access network management configuration method includes: obtaining a first identifier of a first operator and first management configuration information of an access network management object of the first operator, obtaining a second identifier of a second operator and second management configuration information of the access network management object of the second operator, and creating, based on the first management configuration information and the second management configuration information, a first operator management instance corresponding to the first operator and a second operator management instance corresponding to the second operator in the access network management object.

Based on the access network management configuration method in the first aspect, the first management unit may create, based on the first management configuration information and the second management configuration information, the first operator management instance corresponding to the first operator and the second operator management instance corresponding to the second operator in the access network management object. The created first operator management instance may be different from the second operator management instance. Differentiated configuration requirements between different operators or between an operator and an enterprise can be met, to improve flexibility of network configuration.

In a possible design solution, either of the first management configuration information and the second management configuration information may include one or more of the following: a cell identifier, a tracking area, a 5QI configuration parameter, a slice configuration parameter, a service configuration parameter, a core network configuration parameter, a frequency parameter, a neighboring cell parameter, a neighboring frequency parameter, and a private network configuration parameter.

In a possible design solution, the slice configuration parameter may include network slice selection assistance information and/or a slice resource usage policy. The service configuration parameter may include one or more of the following: a service type, a service feature, and UE group information. The core network configuration parameter may include information about an access and mobility management function and/or user plane function information. The frequency parameter may include one or more of the following: uplink and downlink frequencies, frequency bandwidth, and a carrier spacing. The neighboring cell parameter includes at least one neighboring cell identifier and/or a handover parameter.

In a possible design solution, either of the first management configuration information and the second management configuration information may include operator indication information. The operator indication information may indicate that the operator is a primary operator, a secondary operator, or a private network enterprise. The primary operator is an operator that provides an access network corresponding to an access network management object, the secondary operator is an operator that uses the access network, and the private network enterprise is an enterprise that provides the access network or an enterprise that uses the access network.

In a possible design solution, the access network management object may include one or more of the following: a subnetwork object, a network element object, a network function object, and a cell object.

In a possible design solution, the obtaining a first identifier of a first operator and first management configuration information of an access network management object of the first operator may include: receiving a first request from a management unit of the first operator, where the first request carries the first identifier and the first management configuration information.

In a possible design solution, the obtaining a second identifier of a second operator and second management configuration information of the access network management object of the second operator may include: The first request carries the second identifier and the second management configuration information; a second request is received from the management unit of the first operator, where the second request carries the second identifier and the second management configuration information; or a third request is received from a management unit of the second operator, where the third request carries the second identifier and the second management configuration information. In other words, the first management unit may obtain the first identifier, the first management configuration information, the second identifier, and the second management configuration information from the management unit of the first operator, or may separately obtain the first identifier and the first management configuration information from the management unit of the first operator, and obtain the second identifier and the second management configuration information from the management unit of the second operator.

In a possible design solution, the access network management configuration method in the first aspect may further include: sending a first message to the management unit of the first operator, where the first message may indicate whether the first operator management instance and the second operator management instance are successfully created; sending a second message and a third message to the management unit of the first operator, where the second message indicates whether the first operator management instance is successfully created, and the third message indicates whether the second operator management instance is successfully created; sending a fourth message to the management unit of the first operator, where the fourth message indicates whether the first operator management instance is successfully created; or sending a fifth message to the management unit of the second operator, where the fifth message indicates whether the second operator management instance is successfully created. In other words, the first management unit may return, to the management unit of the first operator or the management unit of the second operator, a message indicating whether the operator management instance is successfully created.

In a possible design solution, the access network management configuration method in the first aspect may further include: receiving a sixth message, and configuring second resource availability information in the second operator management instance. The sixth message may include the second resource availability information of the second operator, and the second resource availability information may indicate a quantity or a proportion of access network resources that can be used by the second operator. In this way, in a maintenance phase, the first management unit may determine the second resource availability information, where the second resource availability information may be different from first resource availability information of the first operator, so that differentiated requirements between different operators or between an operator and an enterprise can be met.

In a possible design solution, the access network management configuration method in the first aspect may further include: receiving a management message. The management message may include a management rule of management data, and the management rule may include one or more of the following: operator granularity statistics indication information, the second identifier of the second operator, and a management data receiver address of the second operator. In this way, in a network monitoring phase, management data of different operators may be separately collected statistics on, so that differentiated requirements between a plurality of operators or between an operator and an enterprise can be met.

In a possible design solution, the access network management configuration method in the first aspect may further include: determining the management data of the second operator according to the management rule, and sending the management data of the second operator to the management data receiver address of the second operator. In this way, the first management unit may collect statistics on the management data of the second operator, so that differentiated requirements between a plurality of operators or between an operator and an enterprise can be met.

According to a second aspect, an access network management configuration method is provided. The access network management configuration method includes: A management unit of a first operator determines a first identifier of the first operator and first management configuration information of an access network management object of the first operator, and sends the first identifier and the first management configuration information to a first management unit, to enable creation of a first operator management instance corresponding to the first operator in the access network management object.

In a possible design solution, the first management configuration information may include one or more of the following: a cell identifier, a tracking area, a 5QI configuration parameter, a slice configuration parameter, a service configuration parameter, a core network configuration parameter, a frequency parameter, a neighboring cell parameter, a neighboring frequency parameter, and a private network configuration parameter.

In a possible design solution, the slice configuration parameter may include network slice selection assistance information and/or a slice resource usage policy. The service configuration parameter may include one or more of the following: a service type, a service feature, and UE group information. The core network configuration parameter may include information about an access and mobility management function and/or user plane function information. The frequency parameter may include one or more of the following: uplink and downlink frequencies, frequency bandwidth, and a carrier spacing. The neighboring cell parameter includes at least one neighboring cell identifier and/or a handover parameter.

In a possible design solution, the first management configuration information may include operator indication information. The operator indication information may indicate that the operator is a primary operator, a secondary operator, or a private network enterprise. The primary operator is an operator that provides an access network corresponding to an access network management object, the secondary operator is an operator that uses the access network, and the private network enterprise is an enterprise that provides the access network or an enterprise that uses the access network.

In a possible design solution, the access network management object may include one or more of the following: a subnetwork object, a network element object, a network function object, and a cell object.

In a possible design solution, that a management unit of a first operator sends the first identifier and the first management configuration information to a first management unit may include: the management unit of the first operator sends a first request to the first management unit, where the first request carries the first identifier and the first management configuration information.

In a possible design solution, the access network management configuration method in the second aspect may further include: The management unit of the first operator sends a second identifier of a second operator and second management configuration information of the access network management object of the second operator to the first management unit, to enable creation of a second operator management instance corresponding to the second operator in the access network management object.

In a possible design solution, that the management unit of the first operator sends a second identifier of a second operator and second management configuration information of the access network management object of the second operator to the first management unit may include: The first request may carry the second identifier and the second management configuration information; or the management unit of the first operator sends a second request to the first management unit, where the second request may carry the second identifier and the second management configuration information.

In a possible design solution, before the management unit of the first operator sends the second identifier of the second operator and the second management configuration information of the access network management object of the second operator to the first management unit, the access network management configuration method in the second aspect may further include: The management unit of the first operator receives the second identifier and the second management configuration information from the management unit of the second operator.

In a possible design solution, the access network management configuration method in the second aspect may further include: The management unit of the first operator receives a first message from the first management unit, where the first message may indicate whether the first operator management instance and the second operator management instance are successfully created; the management unit of the first operator receives a second message and a third message from the first management unit, where the second message may indicate whether the first operator management instance is successfully created, and the third message indicates whether the second operator management instance is successfully created; or the management unit of the first operator receives a fourth message from the first management unit, where the fourth message may indicate whether the first operator management instance is successfully created.

In a possible design solution, the access network management configuration method in the second aspect may further include: The management unit of the first operator sends an access message to the management unit of the second operator, where the access message may include an identifier and access information of the second operator management instance. The access information may include one or more of the following: an address of the first management unit, an identifier of the first management unit, a uniform resource identifier of the first management unit, and access control information of the first management unit.

In a possible design solution, the access network management configuration method in the second aspect may further include: The management unit of the first operator determines second resource availability information of the second operator, and sends a sixth message to the first management unit, where the second resource availability information may indicate a quantity or a proportion of access network resources that can be used by the second operator, and the sixth message may include the second resource availability information of the second operator.

In a possible design solution, the access network management configuration method in the second aspect may further include: The management unit of the first operator sends a management message to the first management unit. The management message may include a management rule of management data, and the management rule may include one or more of the following: operator granularity statistics indication information, the second identifier of the second operator, and a management data receiver address of the second operator.

In addition, for a technical effect of the access network management configuration method in the second aspect, refer to the technical effect of the access network management configuration method in the first aspect. Details are not described herein again.

According to a third aspect, an access network management configuration method is provided. The access network management configuration method includes: A management unit of a second operator determines a second identifier of the second operator and second management configuration information of an access network management object of the second operator, and sends the second identifier and the second management configuration information to a first management unit, to enable creation of a second operator management instance corresponding to the second operator in the access network management object.

In a possible design solution, the second management configuration information may include one or more of the following: a cell identifier, a tracking area, a 5QI configuration parameter, a slice configuration parameter, a service configuration parameter, a core network configuration parameter, a frequency parameter, a neighboring cell parameter, a neighboring frequency parameter, and a private network configuration parameter.

In a possible design solution, the slice configuration parameter may include network slice selection assistance information and/or a slice resource usage policy. The service configuration parameter may include one or more of the following: a service type, a service feature, and UE group information. The core network configuration parameter includes information about an access and mobility management function and/or user plane function information. The frequency parameter may include one or more of the following: uplink and downlink frequencies, frequency bandwidth, and a carrier spacing. The neighboring cell parameter includes at least one neighboring cell identifier and/or a handover parameter.

In a possible design solution, the second management configuration information may include operator indication information. The operator indication information may indicate that the operator is a primary operator, a secondary operator, or a private network enterprise. The primary operator is an operator that provides an access network corresponding to an access network management object, the secondary operator is an operator that uses the access network, and the private network enterprise is an enterprise that provides the access network or an enterprise that uses the access network.

In a possible design solution, the access network management object may include one or more of the following: a subnetwork object, a network element object, a network function object, and a cell object.

In a possible design solution, the access network management configuration method in the third aspect may further include: The management unit of the second operator receives a fifth message from the first management unit, where the fifth message may indicate whether the second operator management instance is successfully created.

In a possible design solution, the access network management configuration method in the third aspect may further include: The management unit of the second operator receives an access message from a management unit of a first operator, where the access message may include an identifier and access information of the second operator management instance. The access information may include one or more of the following: an address of the first management unit, an identifier of the first management unit, a uniform resource identifier of the first management unit, and access control information of the first management unit.

In a possible design solution, the access network management configuration method in the third aspect may further include: The management unit of the second operator determines second resource availability information of the second operator, and sends a sixth message to the first management unit, where the second resource availability information may indicate a quantity or a proportion of access network resources that can be used by the second operator, and the sixth message may include the second resource availability information of the second operator.

In a possible design solution, the access network management configuration method in the third aspect may further include: The management unit of the second operator sends a management message to the first management unit, and receives management data of the second operator from the first management unit. The management message may include a management rule of the management data, and the management rule may include one or more of the following: operator granularity statistics indication information, the second identifier of the second operator, and a management data receiver address of the second operator.

In addition, for a technical effect of the access network management configuration method in the third aspect, refer to the technical effect of the access network management configuration method in the first aspect. Details are not described herein again.

According to a fourth aspect, a management apparatus is provided. The management apparatus includes a processor. The processor is configured to read a program from a memory, run the program, and perform the access network management configuration method according to any one of the possible implementations of the first aspect.

In a possible design, the management apparatus in the fourth aspect may further include the memory. The memory is configured to store a computer program.

In this application, the management apparatus in the fourth aspect may be a first management unit, or a chip (a system) or another part or component that may be disposed in the first management unit.

In addition, for a technical effect of the management apparatus in the fourth aspect, refer to a technical effect of the access network management configuration method according to any one of the implementations of the first aspect. Details are not described herein again.

According to a fifth aspect, a management apparatus is provided. The management apparatus includes a processor. The processor is configured to read a program from a memory, run the program, and perform the access network management configuration method according to any one of the possible implementations of the second aspect.

In a possible design, the management apparatus in the fifth aspect may further include the memory. The memory is configured to store a computer program.

In this application, the management apparatus in the fifth aspect may be a management unit of a first operator, or a chip (a system) or another part or component that may be disposed in the management unit of the first operator.

In addition, for a technical effect of the management apparatus in the fifth aspect, refer to a technical effect of the access network management configuration method according to any one of the implementations of the second aspect. Details are not described herein again.

According to a sixth aspect, a management apparatus is provided. The management apparatus includes a processor. The processor is configured to read a program from a memory, run the program, and perform the access network management configuration method according to any one of the possible implementations of the third aspect.

In a possible design, the management apparatus in the sixth aspect may further include the memory. The memory is configured to store a computer program.

In this application, the management apparatus in the sixth aspect may be a management unit of a second operator, or a chip (a system) or another part or component that may be disposed in the management unit of the second operator.

In addition, for a technical effect of the management apparatus in the sixth aspect, refer to a technical effect of the access network management configuration method according to any one of the implementations of the third aspect. Details are not described herein again.

According to a seventh aspect, a communication system is provided. The system includes a first management unit, a management unit of a first operator, and at least one management unit of a second operator.

According to an eighth aspect, a computer-readable storage medium is provided. The computer-readable storage medium includes a computer program or instructions; and when the computer program or the instructions are run on a computer, the computer is enabled to perform the access network management configuration method according to any one of the possible implementations of the first aspect to the third aspect.

According to a ninth aspect, a computer program product, including a computer program or instructions; and when the computer program or the instructions are run on a computer, the computer is enabled to perform the access network management configuration method according to any one of the possible implementations of the first aspect to the third aspect.

DESCRIPTION OF EMBODIMENTS

Figure 1:
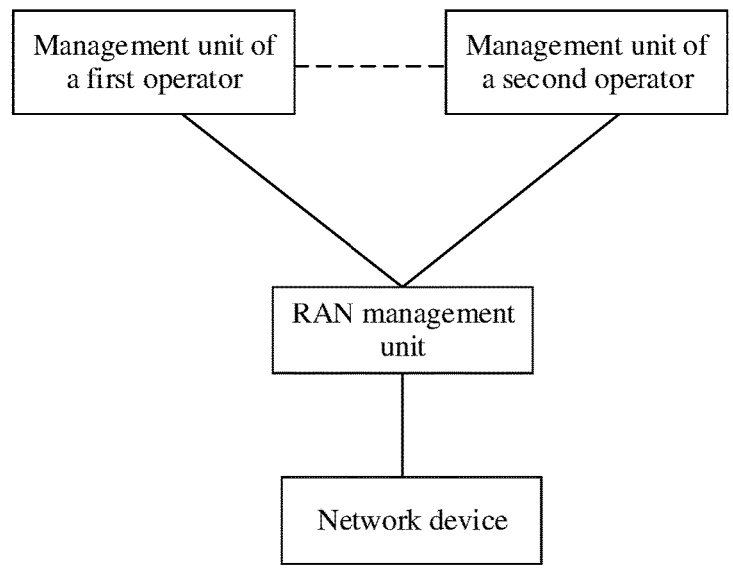
FIG. 1 is a schematic diagram of an architecture of a communication system according to an embodiment of this application.

The following describes technical solutions in this application with reference to the accompanying drawings.

The technical solutions in embodiments of this application may be applied to various communication systems, for example, a wireless fidelity (wireless fidelity, Wi-Fi) system, a vehicle to everything (vehicle to everything, V2X) communication system, a device-to-device (device-to-device, D2D) communication system, an internet of vehicles communication system, a 4th generation (4th generation, 4G) mobile communication system such as a long term evolution (long term evolution, LTE) system and a worldwide interoperability for microwave access (worldwide interoperability for microwave access, WiMAX) communication system, a 5th generation (5th generation, 5G) mobile communication system such as a new radio (new radio, NR) system, and a future communication system such as a 6th generation (6th generation, 6G) mobile communication system. In addition, the foregoing communication system may be further applied to a future-oriented communication technology to which the technical solutions provided in embodiments of this application are applicable.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Any embodiment or design solution described as an "example" in this application should not be explained as being more preferred or having more advantages than another embodiment or design solution. Exactly, the word "example" is used to present a concept in a specific manner.

In embodiments of this application, "information (information)", "signal (signal)", "message (message)", "channel (channel)", and "signaling (signaling)" may be interchangeably used sometimes. It should be noted that expressed meanings are consistent when differences are not emphasized. The terms "of (of)", "corresponding (corresponding, relevant)", and "corresponding (corresponding)" may be interchangeably used sometimes. It should be noted that expressed meanings are consistent when differences are not emphasized.

A network architecture and a service scenario described in embodiments of this application are intended to describe the technical solutions in embodiments of this application more clearly, and do not constitute a limitation on the technical solutions provided in embodiments of this application. A person of ordinary skill in the art may learn that: With evolution of the network architecture and emergence of a new service scenario, the technical solutions provided in embodiments of this application are also applicable to similar technical problems.

FIG. 1 is a schematic diagram of an architecture of a communication system to which an access network management configuration method is applicable according to an embodiment of this application. For ease of understanding embodiments of this application, a communication system shown in FIG. 1 is first used as an example to describe in detail a communication system applicable to embodiments of this application. It should be noted that the solutions in embodiments of this application may also be applied to another mobile communication system, and a corresponding name may also be replaced with a name of a corresponding function in the another mobile communication system.

As shown in FIG. 1, the communication system includes a radio access network (radio access network, RAN) management unit, a management unit of a first operator, and a management unit of a second operator. Optionally, the communication system may further include a network device. There may be one or more management units of the second operator. In a spectrum sharing scenario, the management unit of the first operator may be a primary operator network management system, and the management unit of the second operator may be a secondary operator network management system. In a scenario in which an operator and an enterprise share a RAN, the management unit of the first operator may be an operator network management system, and the management unit of the second operator may be a private network enterprise network management system.

The RAN management unit may be a network slice subnet management function (network slice subnet management function, NSSMF), a subnetwork management system (subnetwork management function, SMF), a domain manager system (domain manager, DM), an element manager system (element manager, EM), a domain management data analytics function (management data analytics function, MDAF), a RAN intelligent controller (RAN intelligent controller, RIC), an external controller (RAN external controller), an application controller (application controller, APPC), a mobile network automation engine (mobile automation engine, MAE), or the like. In some scenarios, the RAN management unit may be deployed in one or more network elements included in the RAN. The RAN management unit may provide an operation and maintenance function or a management service of the RAN or the network element, including at least one of life cycle management, deployment, fault management, performance assurance, and an optimization function of the RAN or the network element. The RAN herein includes one or more network elements. In the present disclosure, the RAN management unit is mainly configured to configure a base station.

The operator network management system may be a network manager system (network manager, NM), a cross-domain network management system (cross-domain network management function), an operations support system (operations support system, OSS), or a network slice management system (network slice management function, NSMF). The operator network management system may provide a network operation and maintenance function or a management service, including at least one of network life cycle management, network deployment, network fault management, network performance management, network configuration management, network assurance, and a network optimization function.

The private network enterprise network management system may be a service operation system of a third-party enterprise, and is responsible for a service operation function of the third-party enterprise, including service provisioning, service deployment, service monitoring, and the like.

The network device is a device that is located on a network side of the communication system and that has a wireless transceiver function, or a chip or a chip system that can be disposed in the device. The network device includes but is not limited to: an access point (access point, AP) in a wireless fidelity (wireless fidelity, Wi-Fi) system, such as a home gateway, a router, a server, a switch, and a bridge, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), a wireless relay node, a wireless backhaul node, a transmission point (transmission reception point, TRP; or transmission point, TP), or the like. The network device may alternatively be a gNB or a transmission point (TRP or TP) in a 5G system, for example, a new radio (new radio, NR) system, or one antenna panel or a group of antenna panels (including a plurality of antenna panels) of a base station in a 5G system. The network device may alternatively be a network node, such as a baseband unit (BBU), a distributed unit (distributed unit, DU), or a road side unit (road side unit, RSU) having a base station function, that constitutes a gNB or a transmission point.

It should be noted that the access network management configuration method provided in embodiments of this application is applicable to communication between any two nodes shown in FIG. 1, for example, between the management unit of the first operator and the management unit of the second operator, between the management unit of the first operator and the RAN management unit, and between the management unit of the second operator and the RAN management unit.

It should be understood that FIG. 1 is merely a simplified schematic diagram for ease of understanding. The communication system may further include another operator network management system and/or another device, which is not shown in FIG. 1.

Figure 2:
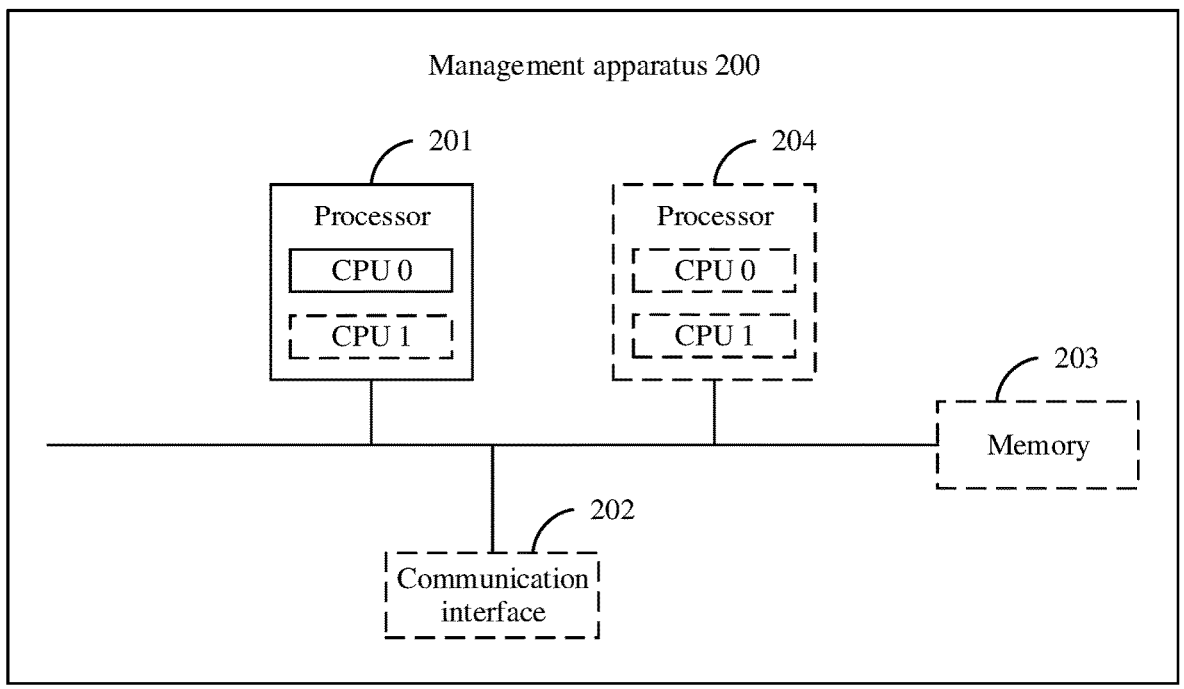
FIG. 2 is a schematic diagram 1 of a structure of a management apparatus according to an embodiment of this application.

FIG. 2 is a schematic diagram of a structure of a management apparatus 200 that can be configured to perform an access network management configuration method according to an embodiment of this application. The management apparatus 200 may be a management unit of a first operator, or may be a chip used in the management unit of the first operator, or another component having a function of the management unit of the first operator. The management apparatus 200 may be a management unit of a second operator, or may be a chip used in the management unit of the second operator, or another component having a function of the management unit of the second operator. The management apparatus 200 may be a RAN management unit, or may be a chip used in the RAN management unit, or another component having a function of the RAN management unit.

As shown in FIG. 2, the management apparatus 200 includes a processor 201. Optionally, the management apparatus 200 may further include a memory 203 and a communication interface 202. The processor 201 may be integrated with the communication interface 202, or may exist independently. The memory 203 may be integrated with the processor 201, or may exist independently. This is not specifically limited in this embodiment of this application.

The following specifically describes each component of the management apparatus 200 with reference to FIG. 2.

The processor 201 is a control center of the management apparatus 200, and may be one processor, or may be a collective name of a plurality of processing elements. For example, the processor 201 is one or more central processing units (central processing units, CPUs), or may be an application-specific integrated circuit (application-specific integrated circuit, ASIC) or one or more integrated circuits configured to implement embodiments of this application, for example, one or more microprocessors (digital signal processors, DSPs) or one or more field programmable gate arrays (field programmable gate arrays, FPGAs).

The processor 201 may perform various functions of the management apparatus 200 by running or executing a software program stored in the memory 203 and invoking data stored in the memory 203.

During specific implementation, in an embodiment, the processor 201 may include one or more CPUs, for example, a CPU 0 and a CPU 1 shown in FIG. 2.

During specific implementation, in an embodiment, the management apparatus 200 may alternatively include a plurality of processors, for example, the processor 201 and a processor 204 shown in FIG. 2. Each of the processors may be a single-core processor (single-CPU) or may be a multi-core processor (multi-CPU). The processor herein may be one or more communication devices, circuits, and/or processing cores configured to process data (for example, computer program instructions).

The memory 203 may be a read-only memory (read-only memory, ROM) or another type of static storage communication device capable of storing static information and instructions, or a random access memory (random access memory, RAM) or another type of dynamic storage communication device capable of storing information and instructions; or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage communication device, or any other medium capable of carrying or storing expected program code in a form of an instruction or a data structure and accessible by a computer. However, this is not limited thereto.

The memory 203 is configured to store a software program for executing the solutions of this application, and the processor 201 controls the execution. For the foregoing specific implementation, refer to the following method embodiments. Details are not described herein again.

The communication interface 202 may be a transceiver circuit, and is configured to communicate with another management apparatus. For example, the management apparatus 200 is the management unit of the first operator, and the communication interface 202 may be configured to communicate with the management unit of the second operator, or communicate with the RAN management unit. For another example, the management apparatus 200 is the management unit of the second operator, and the communication interface 202 may be configured to communicate with the management unit of the first operator, or communicate with the RAN management unit. For still another example, the management apparatus 200 is the RAN management unit, and the communication interface 202 may be configured to communicate with the management unit of the first operator, or communicate with the management unit of the second operator. In addition, the transceiver circuit may be an apparatus, for example, a transceiver or a transceiver machine. Alternatively, the communication interface 202 may be an input/output (input/output, I/O) circuit of the processor 201, and is configured to implement signal input and signal output of the processor 201.

It should be noted that a structure of the management apparatus 200 shown in FIG. 2 does not constitute a limitation on the management apparatus. An actual management apparatus may include more or fewer components than those shown in the figure, combine some components, or have different component arrangements.

The following specifically describes, with reference to FIG. 3 to FIG. 18, the access network management configuration method provided in embodiments of this application.

It should be noted that the access network management configuration method shown in FIG. 3 to FIG. 18 is applicable to scenarios in which a plurality of operators share a same RAN device and a same cell, and an operator and a private network enterprise share a same RAN device and a same cell. In the scenario in which a plurality of operators share a same RAN device and a same cell, an example in which a management unit of a first operator is a primary operator network management system, a management unit of a second operator is a secondary operator network management system, and a first management unit is a RAN management unit is used for description. In the scenario in which an operator and a private network enterprise share a same RAN device and a same cell, an example in which a first management unit is a RAN management unit, a management unit of a first operator is an operator network management system, and a management unit of a second operator is a private network enterprise network management system is used for description.

Figure 3:
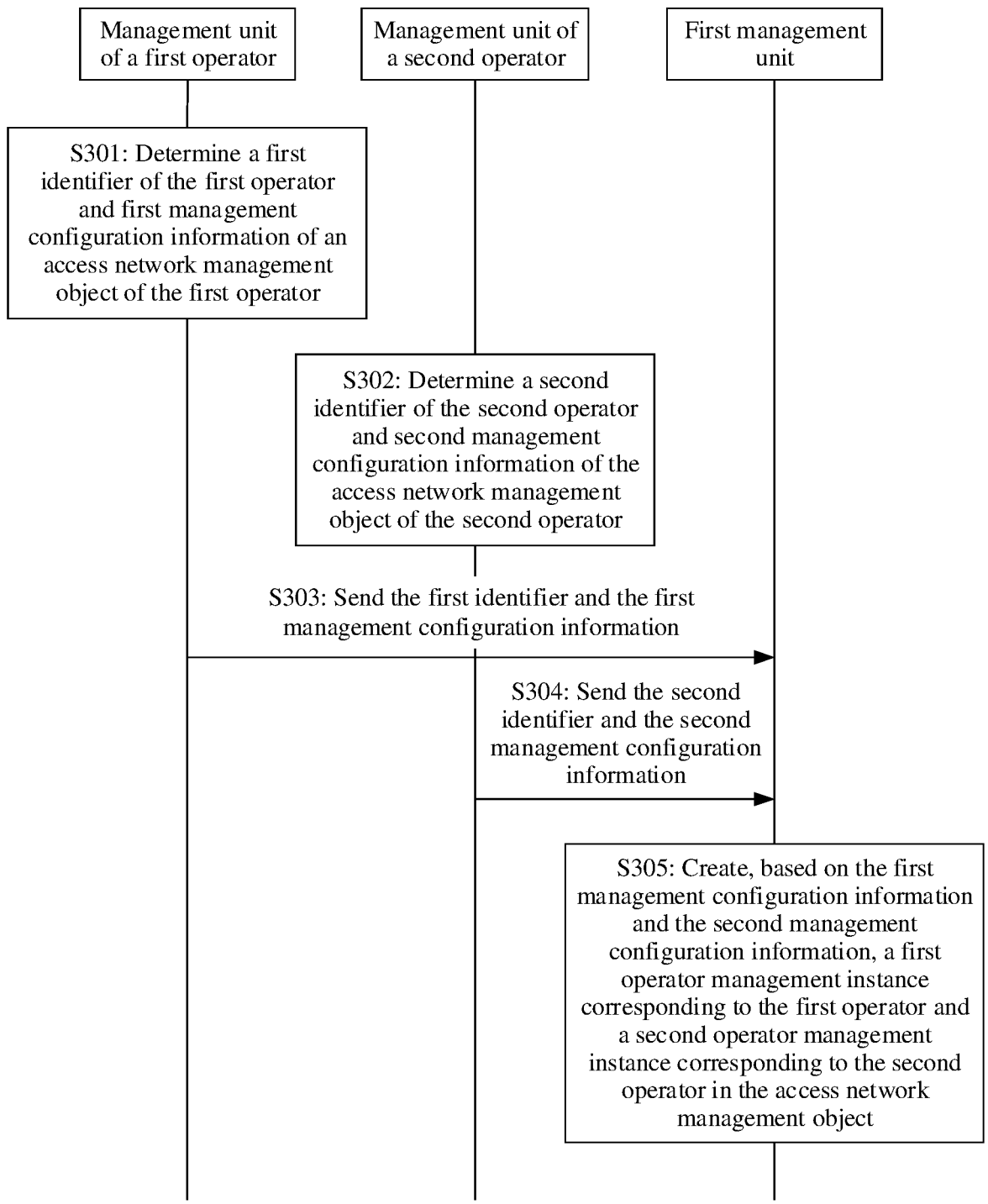
FIG. 3 is a schematic flowchart 1 of an access network management configuration method according to an embodiment of this application.

FIG. 3 is a schematic flowchart 1 of an access network management configuration method according to an embodiment of this application.

As shown in FIG. 3, the access network management configuration method includes the following steps.

S301: A management unit of a first operator determines a first identifier of the first operator and first management configuration information of an access network management object of the first operator.

Optionally, the management unit of the first operator may determine an identifier of at least one operator and management configuration information of an access network management object of the at least one operator.

For example, the identifier of the at least one operator is an identifier of an operator supported by an access network, and the identifier of the at least one operator may include one or more of the following: the first identifier of the first operator, an identifier of at least one second operator, or an identifier of at least one external operator. The identifier of the at least one second operator may include a second identifier of a second operator.

For example, an identifier of any operator in the identifiers of the at least one operator may be an identifier of a public land mobile network (public land mobile network, PLMN) and/or an operator name.

It should be noted that the management configuration information may be generated by the management unit of the first operator or manually imported to the management unit of the first operator. A specific implementation in which the management unit of the first operator determines the management configuration information of the access network management object of the at least one operator is not limited in this application.

Optionally, the management configuration information of the access network management object of the operator corresponds to the identifier of the operator.

In some embodiments, the management configuration information of the access network management object of the at least one operator may include management configuration information of one or more access network management objects of all operators corresponding to the identifier of the at least one operator.

For example, the identifier of the at least one operator includes: the first identifier of the first operator and the second identifier of the second operator, and the management configuration information of the access network management object of the at least one operator includes the first management configuration information of the access network management object of the first operator and second management configuration information of the access network management object of the second operator.

In some other embodiments, the management configuration information of the access network management object of the at least one operator may include management configuration information of one or more access network management objects of a part of operators in operators corresponding to the identifier of the at least one operator.

For example, the identifier of the at least one operator includes: the first identifier of the first operator and the second identifier of the second operator, and the management configuration information of the access network management object of the at least one operator may include only the first management configuration information of the access network management object of the first operator, and not include the second management configuration information of the access network management object of the second operator.

In some embodiments, either of the first management configuration information and the second management configuration information includes one or more of the following: a cell identifier, a tracking area, a 5QI configuration parameter, a slice configuration parameter, a service configuration parameter, a core network configuration parameter, a frequency parameter, a neighboring cell parameter, a neighboring frequency parameter, and a private network configuration parameter.

The cell identifier may include one or more of the following: an NR cell identifier (NR cell identifier, NCI), an NR cell global identifier (NR cell global identifier, NCGI), or a cell local identifier (cell local identifier).

The tracking area may include tracking area code (tracking area code, TAC).

The 5QI configuration parameter may include one or more of the following: a 5QI object identifier (distinguished name of the configurable5QIset information object class), a 5QI value, a resource type (resource type) corresponding to the 5QI value, a priority level (priority level), a packet delay budget (packet delay budget), a packet error rate (packet error rate), an average window (average window), and a maximum data burst volume (maximum data burst volume).

The slice configuration parameter may include one or more of the following: network slice selection assistance information (single network slice selection assistance information, S-NSSAI), a slice resource usage policy, a slice priority, a slice subnetwork identifier, and a tenant identifier.

The service configuration parameter may include one or more of the following: a service type, a service feature, and UE group information.

The core network configuration parameter may include one or more of the following: information about an access and mobility management function (access and mobility management function, AMF) and/or user plane function (user plane function, UPF) information, for example, an identifier or an address of the AMF, or an identifier or an address of the UPF, where the address includes an IP address or a VLAN ID.

The frequency parameter may include one or more of the following: uplink and downlink frequencies, frequency bandwidth, and a carrier spacing.

The neighboring cell parameter may include at least one neighboring cell identifier and/or a handover parameter.

The neighboring frequency parameter may include values of uplink and downlink neighboring frequencies, frequency bandwidth of a neighboring frequency, and a carrier spacing of the neighboring frequency.

The private network configuration parameter may include one or more of the following: a closed access group identifier (closed access group identifier, CAG ID), a network identifier (network identifier, NID), and scenario information. The scenario information indicates that the private network scenario is a PLMN scenario, a PNI-NPN scenario, or an SNPN scenario.

In some embodiments, either of the first management configuration information and the second management configuration information may include operator indication information.

Optionally, the operator indication information may indicate that the operator is a primary operator, a secondary operator, or a private network enterprise. The primary operator is an operator that provides an access network corresponding to the access network management object, the secondary operator is an operator that uses the access network, and the private network enterprise is an enterprise that provides the access network or an enterprise that uses the access network.

For example, the access network management object may include one or more of the following: a subnetwork object, a network element object, a network function object, and a cell object.

The subnetwork (subnetwork) object is used to describe management information of a RAN.

The network element object may include a managed network element object, and the managed network element (managed element) object is used to describe management information of a RAN physical node managed by a RAN management unit.

The network function object may include a managed function object and/or an external function object.

The managed function (managed function) object is used to describe management information of a RAN logical function. The RAN logical function herein is a RAN logical function managed by the RAN management unit. The RAN logical function includes but is not limited to a gNB function (gNB function), a gNB central unit control plane function (gNB central unit control plane function, gNBCUCP), a gNB central unit user plane function (gNB central unit user plane function, gNBCUUP), and a gNB distributed unit function (gNB distributed unit function, gNBDU).

An external function (external function) object indicates management information of a RAN logical function managed by another RAN management unit. The external logical function includes but is not limited to an external gNB function (external gNB function), an external gNB central unit control plane function (external gNB central unit control plane function), an external gNB central unit user plane function (external gNB central unit user plane function), an external gNB distributed unit function (external gNB distributed unit function), and an external eNB function (external eNB function).

The cell object may include a local cell object (or referred to as a cell object) and an external cell object.

The cell (cell) object is used to describe management information of a RAN cell. The RAN cell is a RAN cell managed by the RAN management unit, and the RAN cell includes NRCellCU, NRCellDU, and NRCell.

The external cell (external cell) object refers to the management information about a RAN cell managed by another RAN management unit. The external RAN cell includes but is not limited to ExternalNRCellCU, ExternalNRCellDU, ExternalNRCell, and ExternalEutranCell.

S302: A management unit of the second operator determines the second identifier of the second operator and the second management configuration information of the access network management object of the second operator.

Optionally, the management unit of the second operator may determine the identifier of the at least one operator and the management configuration information of the access network management object of the at least one operator.

For example, the identifier of the at least one operator may include the second identifier of the second operator and/or an identifier of an external operator associated with the second operator, and the management configuration information of the access network management object of the at least one operator may include the second management configuration information of the access network management object of the second operator, and/or management configuration information of access network management object of the external operator associated with the second operator.

In other words, the management unit of the second operator may independently determine the management configuration information of the management unit of the second operator, and/or the management configuration information of the access network management object of the external operator associated with the second operator, to meet differentiated configuration requirements between different operators or between an operator and an enterprise.

In a possible design solution, the management unit of the second operator may send the second identifier and the second management configuration information to the management unit of the first operator. Correspondingly, the management unit of the first operator may receive the second identifier and the second management configuration information from the management unit of the second operator.

Optionally, the management unit of the second operator may send, to the management unit of the first operator, the identifier of the at least one operator and the management configuration information of the access network management object of the at least one operator, such as the second identifier, the second management configuration information, the identifier of the external operator associated with the second operator, and the management configuration information of the access network management object of the external operator associated with the second operator.

It should be noted that the management unit of the second operator may send the second identifier and the second management configuration information to the management unit of the first operator before S301. A specific occasion for sending the second identifier and the second management configuration information by the management unit of the second operator is not limited in this application. A sequence of S301 and S302 is not limited in this application.

It should be noted that, when S301 includes that the management unit of the first operator determines the second identifier of the second operator and the second management configuration information of the access network management object of the second operator, S302 is optional. When S301 includes that the management unit of the first operator determines the second identifier of the second operator and the second management configuration information of the access network management object of the second operator, and S302 is also performed, the second management configuration information in S301 may be the same as or different from the second management configuration information in S302.

S303: The management unit of the first operator sends the first identifier and the first management configuration information to a first management unit. Correspondingly, the first management unit obtains the first identifier and the first management configuration information.

Specifically, the management unit of the first operator sends the first identifier and the first management configuration information to the first management unit, to enable creation of a first operator management instance corresponding to the first operator in the access network management object.

In a possible design solution, S302 may include: The management unit of the first operator sends a first request to the first management unit. Correspondingly, the first management unit receives the first request from the management unit of the first operator.

Optionally, the first request may carry the first identifier and the first management configuration information.

In some embodiments, the first request may carry an identifier of the access network management object and configuration information of the access network management object.

Optionally, the identifier of the access network management object and the configuration information of the access network management object may be used to create or modify the access network management object.

For example, the configuration information of the access network management object may include one or more of the following: a configuration parameter of a subnetwork, a configuration parameter of a managed network element, a configuration parameter of a managed function, a configuration parameter of a cell, a configuration parameter of an external function, a configuration parameter of an external cell, and an identifier of an access network.

The identifier of the access network may include one or more of the following: an identifier of a subnetwork, an identifier of a managed network element, an identifier of a managed function, an identifier of a cell, an identifier of an external function, and an identifier of an external cell, for example, a distinguished name (distinguished name, DN) of a subnetwork, a DN of a managed network element, a DN of a managed function, a DN of a cell, a DN of an external function, and a DN of an external cell.

In other words, the first request may be used to request the first management unit to create the operator management instance based on the first identifier and the first management configuration information, and be used to request the first management unit to create or modify the access network management object based on the identifier of the access network management object and the configuration information of the access network management object.

In a possible design solution, the management unit of the first operator may send the second identifier of the second operator and the second management configuration information of the access network management object of the second operator to the first management unit. Correspondingly, the first management unit obtains the second identifier and the second management configuration information.

In some embodiments, that the management unit of the first operator may send the second identifier of the second operator and the second management configuration information of the access network management object of the second operator to the first management unit may include: The management unit of the first operator sends the first request to the first management unit.

The first request may carry the second identifier and the second management configuration information.

In other words, in addition to the first identifier and the first management configuration information, the first request may further carry the second identifier and the second management configuration information. The first request may be used to request to create a second operator management instance corresponding to the second operator.

In some other embodiments, that the management unit of the first operator may send the second identifier of the second operator and the second management configuration information of the access network management object of the second operator to the first management unit may include: The management unit of the first operator sends a second request to the first management unit.

The second request may carry the second identifier and the second management configuration information.

In other words, the second request may be used to request to create the second operator management instance corresponding to the second operator.

In some embodiments, that the first management unit obtains the second identifier and the second management configuration information may include: The first request carries the second identifier and the second management configuration information; or the first management unit receives the second request from the management unit of the first operator.

S304: The management unit of the second operator sends the second identifier and the second management configuration information to the first management unit. Correspondingly, the first management unit obtains the second identifier and the second management configuration information.

Specifically, the management unit of the second operator sends the second identifier and the second management configuration information to the first management unit, to enable creation of the first operator management instance corresponding to the first operator in the access network management object.

Optionally, the management unit of the second operator may send the identifier of the at least one operator and the management configuration information of the access network management object of the at least one operator to the first management unit. Correspondingly, the first management unit may receive the identifier of the at least one operator and the management configuration information of the access network management object of the at least one operator from the management unit of the second operator.

For example, the identifier of the at least one operator may include the second identifier of the second operator and/or an identifier of an external operator associated with the second operator, and the management configuration information of the access network management object of the at least one operator may include the second management configuration information of the access network management object of the second operator, and/or management configuration information of access network management object of the external operator associated with the second operator.

In some embodiments, that the management unit of the second operator sends the second identifier and the second management configuration information to the first management unit may include: sending a third request to the first management unit.

Optionally, the third request may carry the second identifier and the second management configuration information.

For example, the third request may further carry an identifier of the second operator management instance.

In other words, the third request may be used to request to create the second operator management instance corresponding to the second operator.

In some embodiments, the third request may further carry the identifier of the external operator associated with the second operator, and/or the management configuration information of the access network management object of the external operator associated with the second operator, and/or an identifier of an external operator management instance associated with the second operator.

In other words, the third request may be further used to request to create the external operator management instance associated with the second operator.

In some embodiments, that the first management unit obtains the second identifier and the second management configuration information may include: The first management unit receives the third request from the management unit of the second operator.

It should be noted that a sequence of S303 and S304 is not limited in this application.

It should be noted that, when S303 includes that the management unit of the first operator sends the second identifier of the second operator and the second management configuration information of the access network management object of the second operator to the first management unit, S304 is optional. When S303 includes that the management unit of the first operator sends the second identifier of the second operator and the second management configuration information of the access network management object of the second operator to the first management unit, and S304 is also performed, the second management configuration information in S303 may be the same as or different from the second management configuration information in S304.

S305: The first management unit creates, based on the first management configuration information and the second management configuration information, the first operator management instance corresponding to the first operator and the second operator management instance corresponding to the second operator in the access network management object.

Optionally, S305 may include: creating only the first operator management instance and the second operator management instance in the access network management object based on the first management configuration information and the second management configuration information; configuring the first operator management instance and the second operator management instance in the access network management object based on the first management configuration information and the second management configuration information; or creating and configuring the first operator management instance and the second operator management instance in the access network management object based on the first management configuration information and the second management configuration information.

In other words, the first management unit may create only the operator management instance, may configure the operator management instance, or may create and configure the operator management instance.

It should be noted that, in this embodiment of this application, creating the operator management instance may include the following plurality of meanings: creating only the operator management instance, configuring the operator management instance, and creating and configuring the operator management instance.

Optionally, the first management unit may select the created operator management instance in the access network management object based on the identifier of the operator.

It should be noted that, before creating the operator management instance, the first management unit may determine whether the operator management instance corresponding to the identifier of the operator exists in the access network management object, to avoid repeated creation.

Alternatively, before configuring the operator management instance, the first management unit may select the operator management instance corresponding to the identifier of the operator, to configure, in the operator management instance, the management configuration information corresponding to the operator, and the like. This application does not limit an occasion for the first management unit to select the created operator management instance in the access network management object.

In a possible design solution, the first management unit may send a first message to the management unit of the first operator. Correspondingly, the management unit of the first operator may receive the first message from the first management unit.

Optionally, the first message may indicate whether the first operator management instance and the second operator management instance are successfully created. If yes, the first message may indicate that both the first operator management instance and the second operator management instance are successfully created. If not, the first message may indicate that one or both of the first operator management instance and the second operator management instance fail to be created.

Specifically, the first message may include the identifier of the at least one operator management instance and/or feedback information, and the feedback information may indicate whether the at least one operator management instance is successfully created.

Optionally, the identifier of the at least one operator management instance may include one or more of the following: an identifier of the first operator management instance, an identifier of at least one second operator management instance, or an identifier of at least one external operator management instance.

In other words, after creating the operator management instance, the first management unit may send the identifier of the at least one successfully created operator management instance to the management unit of the first operator, to indicate the successfully created operator management instance, and may indicate, by using the feedback information, which operator management instance/operator management instances is/are successfully created and which operator management instance/operator management instances fails/fail to be created.

In another possible design solution, the first management unit may send a second message and a third message to the management unit of the first operator. Correspondingly, the management unit of the first operator may receive the second message and the third message from the first management unit.

Optionally, the second message may indicate whether the first operator management instance is successfully created, and the third message may indicate whether the second operator management instance is successfully created.

Specifically, the second message may include the identifier of the at least one operator management instance and/or feedback information, and the feedback information may indicate whether the at least one operator management instance is successfully created.

Optionally, the identifier of the at least one operator management instance may include one or more of the following: the first identifier or an identifier of at least one external operator management instance.

Specifically, the third message may include the identifier of the second operator management instance and/or feedback information, and the feedback information may indicate whether only creation is successfully performed on the second operator management instance. If the third message indicates that only creation is successfully performed, the third message may include the identifier of the second operator management instance.

In other words, after creating the operator management instance, the first management unit may send the identifier of the at least one successfully created operator management instance to the management unit of the first operator, to indicate the successfully created operator management instance, may send the second identifier of the second operator to the management unit of the first operator, to indicate that the second operator management instance is only successfully created, and may further indicate, by using the feedback information, which operator management instance/operator management instances is/are successfully created and which operator management instance/operator management instances fails/fail to be created.

In still another possible design solution, the first management unit may send a fourth message to the management unit of the first operator. Correspondingly, the management unit of the first operator may receive the fourth message from the first management unit.

Optionally, the fourth message may indicate whether the first operator management instance is successfully created.

Specifically, the fourth message may include the identifier of the at least one operator management instance and/or feedback information, and the feedback information may indicate whether the at least one operator management instance is successfully created.

Optionally, the identifier of the at least one operator management instance may include one or more of the following: the first identifier and an identifier of at least one external operator management instance associated with the first operator.

In other words, after creating the operator management instance, the first management unit may send the identifier of the at least one successfully created operator management instance to the management unit of the first operator, to indicate the successfully created operator management instance, and may indicate, by using the feedback information, which operator management instance/operator management instances is/are successfully created and which operator management instance/operator management instances fails/fail to be created.

In a possible design solution, the first management unit may send a fifth message to the management unit of the second operator. Correspondingly, the management unit of the second operator may receive the fifth message from the first management unit.

Optionally, the fifth message may indicate whether the second operator management instance is successfully created.

Specifically, the fifth message may include the identifier of the at least one operator management instance and/or feedback information, and the feedback information may indicate whether the at least one operator management instance is successfully created.

Optionally, the identifier of the at least one operator management instance may include one or more of the following: an identifier of at least one second operator management instance and an identifier of at least one external operator management instance associated with the second operator.

In other words, after creating the operator management instance, the first management unit may send the identifier of the at least one successfully created operator management instance to the management unit of the second operator, to indicate the successfully created operator management instance, and may further indicate, by using the feedback information, which operator management instance/operator management instances is/are successfully created and which operator management instance/operator management instances fails/fail to be created.

In a possible design solution, the management unit of the first operator may send an access message to the management unit of the second operator. Correspondingly, the management unit of the second operator may receive the access message from the management unit of the first operator.

The access message may include the identifier of the second operator management instance and/or access information.

For example, the access information may be used to access the first management unit, and the access information may include one or more of the following: an address of the first management unit, an identifier of the first management unit, a uniform resource identifier URI of the first management unit, and access control information of the first management unit.

In other words, the management unit of the second operator may access the first management unit based on the access information, so that the first management unit completes configuration on the second operator management instance.

Optionally, after receiving the access message from the management unit of the first operator, the management unit of the second operator may send the identifier of the second operator management instance and the second management configuration information to the first management unit. Correspondingly, the first management unit receives the identifier of the second operator management instance and the second management configuration information from the management unit of the second operator.

In other words, the management unit of the second operator may send the identifier of the second operator management instance and the second management configuration information to the first management unit, to indicate the first management unit to configure the second operator management instance corresponding to the identifier of the second operator management instance.

In a possible design solution, that the first management unit may configure an association relationship between an operator object instance and an NgC/NgU object instance or an Xn object instance specifically includes: configuring an identifier of the operator object instance in the NgC/NgU object instance or the Xn object instance, or configuring an identifier of the NgC/NgU object instance or an identifier of the Xn object instance in the operator object instance.

For example, an identifier of a first operator object instance and an identifier of a second operator object instance are configured in the NgC/NgU object instance or the Xn object instance, or the identifier of the NgC/NgU object instance or the identifier of the Xn object instance is configured in the first operator object instance, and the identifier of the NgC/NgU object instance or the identifier of the Xn object instance is configured in the second operator object instance.

It should be noted that a sequence of S301 to S305 is not limited in this application.

Based on the access network management configuration method shown in FIG. 3, the first management unit may obtain the first identifier of the first operator, the first management configuration information of the access network management object of the first operator, the second identifier of the second operator, and the second management configuration information of the access network management object of the second operator, and then create, based on the first management configuration information and the second management configuration information, the first operator management instance corresponding to the first operator and the second operator management instance corresponding to the second operator in the access network management object. The created first operator management instance and the created second operator management instance may be different, so that differentiated configuration requirements between different operators or between an operator and an enterprise can be met, and flexibility of network configuration can be improved.

Figure 4:
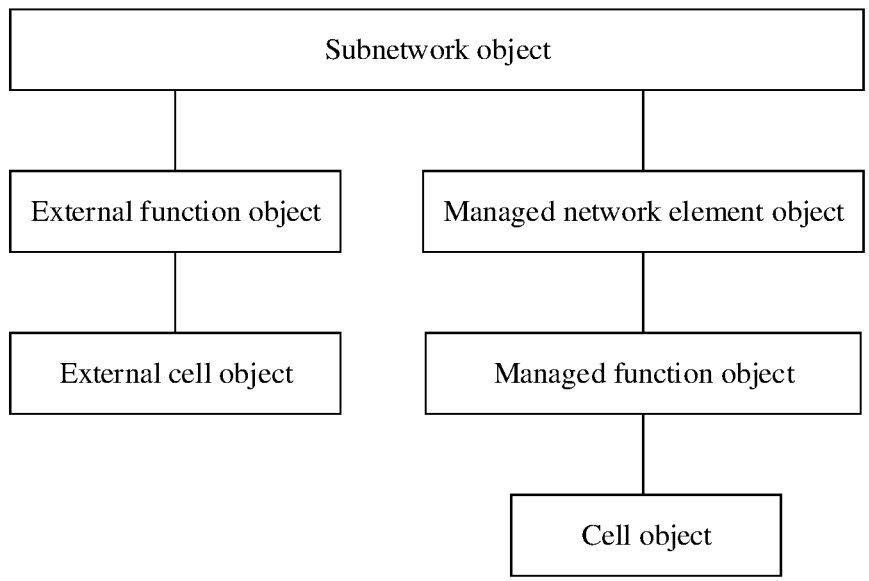
FIG. 4 is a schematic diagram of a structure of a RAN object according to an embodiment of this application.

FIG. 4 is a schematic diagram of a structure of an access network management object according to an embodiment of this application.

As shown in FIG. 4, the access network management object may include a subnetwork object, and the subnetwork object may include at least one managed network element object and/or at least one external function object. The managed network element object may include at least one managed function object, and the managed function object may include at least one cell object. The external function object may include at least one external cell object.

Optionally, a management unit of a first operator may determine an identifier of at least one operator management instance.

For example, the identifier of the operator management instance may be used to identify the operator management instance, and may be used to create and/or configure the operator management instance. The identifier of the operator management instance may include a DN and/or a uniform resource identifier (uniform resource identifier, URI) of the operator management instance.

With reference to FIG. 5 to FIG. 11, the following describes how a first management unit creates the operator management instance in the access network managed object.

FIG. 5 to FIG. 8 are specific examples in which the first management unit creates a first operator management instance and a second operator management instance.

Figure 5:
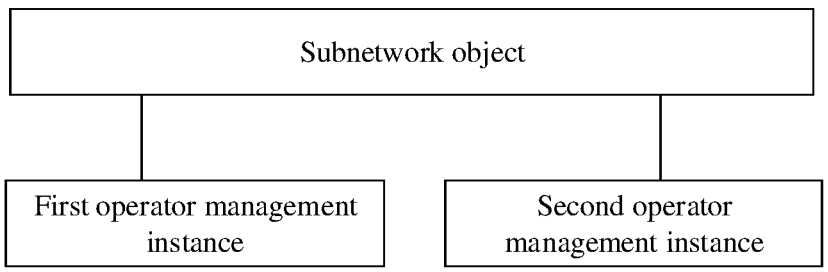
FIG. 5 is a schematic diagram 1 of creating an operator management instance according to an embodiment of this application.

FIG. 5 is a schematic diagram 1 of creating an operator management instance according to an embodiment of this application.

As shown in FIG. 5, for example, an access network management object is a subnetwork object, and a first management unit may create only a first operator management instance and a second operator management instance in the subnetwork object based on a first identifier and a second identifier. Optionally, the method further includes: The first management unit may configure first management configuration information in the first operator management instance, and may further configure the first identifier of a first operator and/or an identifier of the first operator management instance. The first management unit may configure second management configuration information in the second operator management instance, and may further configure the second identifier of a second operator and/or an identifier of the second operator management instance.

Figure 6:
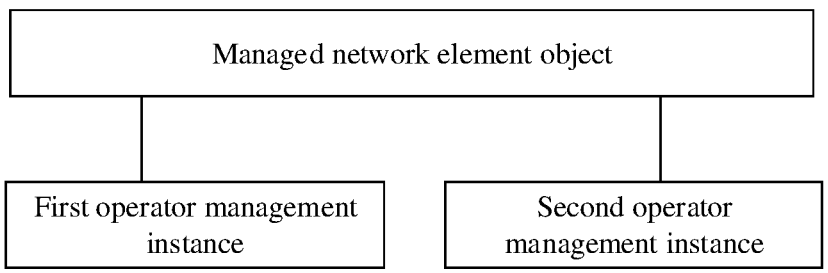
FIG. 6 is a schematic diagram 2 of creating an operator management instance according to an embodiment of this application.

FIG. 6 is a schematic diagram 2 of creating an operator management instance according to an embodiment of this application.

As shown in FIG. 6, for example, an access network management object is a managed network element object, and a first management unit may create only a first operator management instance and a second operator management instance in the managed network element object based on a first identifier and a second identifier. Optionally, the method further includes: The first management unit may configure first management configuration information in the first operator management instance, and may further configure the first identifier of a first operator and/or an identifier of the first operator management instance. The first management unit may configure second management configuration information in the second operator management instance, and may further configure the second identifier of a second operator and/or an identifier of the second operator management instance.

Figure 7:
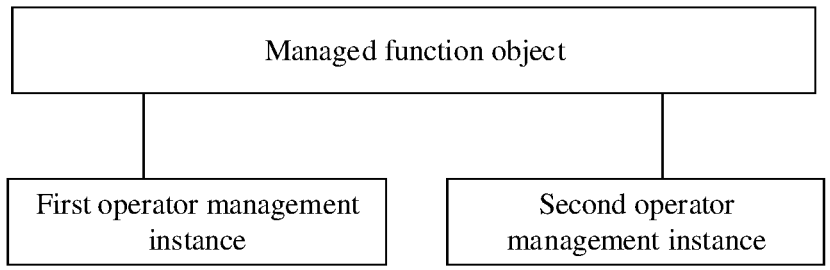
FIG. 7 is a schematic diagram 3 of creating an operator management instance according to an embodiment of this application.

FIG. 7 is a schematic diagram 3 of creating an operator management instance according to an embodiment of this application.

As shown in FIG. 7, for example, an access network management object is a managed function object, and a first management unit may create only a first operator management instance and a second operator management instance in the managed function object based on a first identifier and a second identifier. Optionally, the method further includes: The first management unit may configure first management configuration information in the first operator management instance, and may further configure the first identifier of a first operator and/or an identifier of the first operator management instance. The first management unit may configure second management configuration information in the second operator management instance, and may further configure the second identifier of a second operator and/or an identifier of the second operator management instance.

Figure 8:
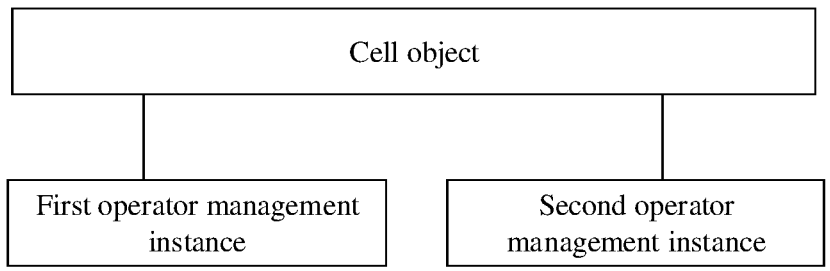
FIG. 8 is a schematic diagram 4 of creating an operator management instance according to an embodiment of this application.

FIG. 8 is a schematic diagram 4 of creating an operator management instance according to an embodiment of this application.

As shown in FIG. 8, for example, an access network management object is a cell object, and a first management unit may create only a first operator management instance and a second operator management instance in the cell object based on a first identifier and a second identifier. Optionally, the method further includes: The first management unit may configure first management configuration information in the first operator management instance, and may further configure the first identifier of a first operator and/or an identifier of the first operator management instance. The first management unit may configure second management configuration information in the second operator management instance, and may further configure the second identifier of a second operator and/or an identifier of the second operator management instance.

It should be noted that FIG. 5 to FIG. 8 use an example in which a communication system includes only one secondary operator network management system (namely, a management unit of the second operator). If the communication system includes a plurality of secondary operator network management systems, in the method provided in embodiments of this application, operator management instances corresponding to a plurality of secondary operators may be created in each access network management object. Details are not listed one by one in this application.

In some embodiments, when an identifier of at least one operator includes an identifier of an external operator, a first management unit may create an external operator management instance corresponding to the external operator. For specific examples, refer to FIG. 9 to FIG. 11.

Figure 9:
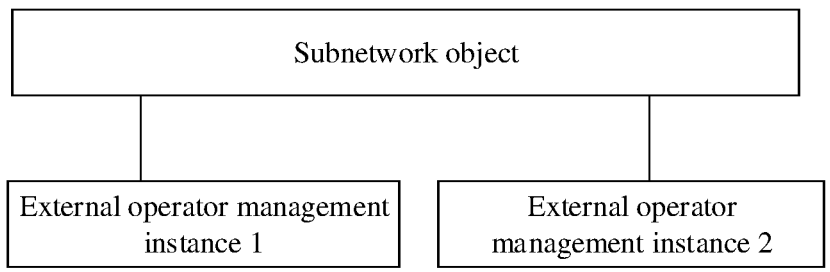
FIG. 9 is a schematic diagram 5 of creating an operator management instance according to an embodiment of this application.

FIG. 9 is a schematic diagram 5 of creating an operator management instance according to an embodiment of this application.

As shown in FIG. 9, for example, an access network management object is a subnetwork object, an identifier of at least one operator includes an identifier 1 of an external operator and an identifier 2 of an external operator, and an external operator management instance 1 and an external operator management instance 2 are created in the subnetwork object. Optionally, the method further includes: A first management unit may configure, in the external operator management instance 1, management configuration information corresponding to the external operator, and may further configure an identifier of the external operator 1, and/or an identifier of the external operator management instance 1. The first management unit may configure, in the external operator management instance 2, management configuration information corresponding to the external operator, and may further configure an identifier of the external operator 2, and/or an identifier of the external operator management instance 2.

Figure 10:
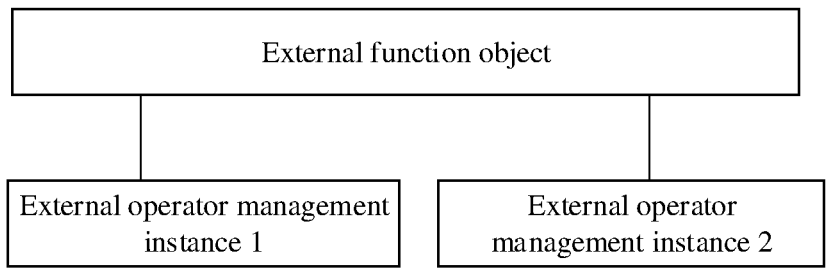
FIG. 10 is a schematic diagram 6 of creating an operator management instance according to an embodiment of this application.

FIG. 10 is a schematic diagram 6 of creating an operator management instance according to an embodiment of this application.

As shown in FIG. 10, for example, an access network management object is an external function object, an identifier of at least one operator includes an identifier 1 of an external operator and an identifier 2 of an external operator, and an external operator management instance 1 and an external operator management instance 2 are created in the external function object. Optionally, the method further includes: A first management unit may configure, in the external operator management instance 1, management configuration information corresponding to the external operator, and may further configure an identifier of the external operator 1, and/or an identifier of the external operator management instance 1. The first management unit may configure, in the external operator management instance 2, management configuration information corresponding to the external operator, and may further configure an identifier of the external operator 2, and/or an identifier of the external operator management instance 2.

Figure 11:
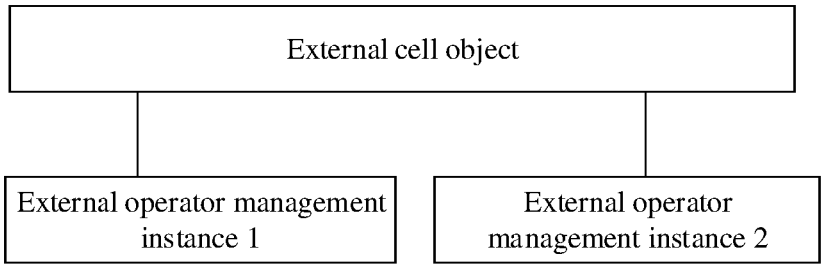
FIG. 11 is a schematic diagram 7 of creating an operator management instance according to an embodiment of this application.

FIG. 11 is a schematic diagram 7 of creating an operator management instance according to an embodiment of this application.

As shown in FIG. 11, for example, an access network management object is an external cell object, an identifier of at least one operator includes an identifier 1 of an external operator and an identifier 2 of an external operator, and an external operator management instance 1 and an external operator management instance 2 are created in the external cell object. Optionally, the method further includes: A first management unit may configure, in the external operator management instance 1, management configuration information corresponding to the external operator, and may further configure an identifier of the external operator 1, and/or an identifier of the external operator management instance 1. The first management unit may configure, in the external operator management instance 2, management configuration information corresponding to the external operator, and may further configure an identifier of the external operator 2, and/or an identifier of the external operator management instance 2.

It should be noted that, in FIG. 9 to FIG. 11, an example in which the identifier of the at least one operator includes identifiers of two external operators is used. The identifier of the at least one operator may include more or fewer identifiers of external operators, and more or fewer external operator management instances may be created in each access network management object. Details are not listed one by one in this application.

Figure 12:
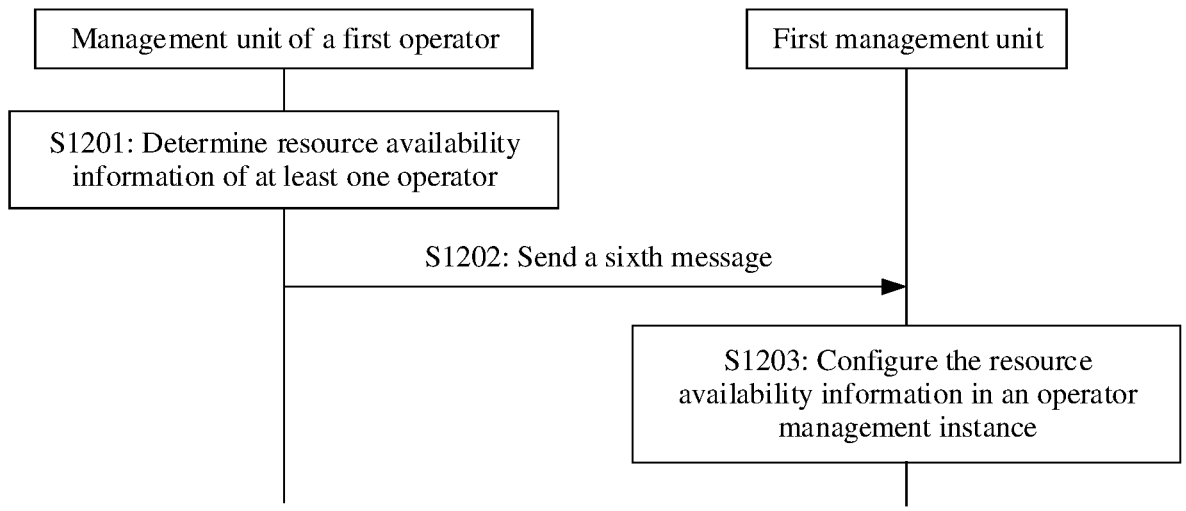
FIG. 12 is a schematic flowchart 2 of an access network management configuration method according to an embodiment of this application.

FIG. 12 is a schematic flowchart 2 of an access network management configuration method according to an embodiment of this application.

In a possible design solution, the access network management configuration method provided in this embodiment of this application may further include the following S1201 to S1203.

S1201: A management unit of a first operator determines resource availability information of at least one operator.

Optionally, the resource availability information may indicate a quantity or a proportion of access network resources that can be used by the at least one operator.

For example, the at least one operator may include the first operator, and/or at least one second operator, and/or at least one external operator. The resource may be a spectrum resource, a resource block (resource block, RB) resource, a quantity of radio resource control (radio resource control, RRC) connected terminal devices, or a data radio bearer (data radio bearer, DRB) resource.

In some embodiments, that a management unit of a first operator determines resource availability information of at least one operator in S1201 may include: The management unit of the first operator determines second resource availability information of a second operator.

Optionally, the second resource availability information may indicate a quantity or a proportion of access network resources that can be used by the second operator.

S1202: The management unit of the first operator sends a sixth message to a first management unit. Correspondingly, the first management unit receives the sixth message from the management unit of the first operator.

Optionally, the sixth message may include the resource availability information of the at least one operator.

For example, the sixth message may include first resource availability information of the first operator and/or second resource availability information of the second operator.

Optionally, the resource availability information is associated with an identifier of an operator and/or an identifier of an operator management instance, and may indicate the resource availability information corresponding to the identifier of the operator and/or the identifier of the operator management instance.

In some embodiments, the resource availability information of the at least one operator may include resource availability information corresponding to identifiers of all operators in an identifier of the at least one operator and/or an identifier of an operator management instance, and the identifier of the at least one operator and/or the identifier of the operator management instance are/is in a one-to-one correspondence with the resource availability information of the at least one operator.

In other words, the resource availability information of the at least one operator may be the resource availability information of all the operators in the at least one operator.

For example, it is assumed that the identifier of the at least one operator and/or the identifier of the operator management instance include/includes: a first identifier of the first operator and/or an identifier of a first operator management instance, and a second identifier of the second operator and/or an identifier of a second operator management instance. The sixth message includes the first resource availability information of the first operator and the second resource availability information of the second operator.

In some other embodiments, the resource availability information of the at least one operator may include resource availability information corresponding to identifiers of a part of operators in the identifier of the at least one operator.

In other words, the resource availability information of the at least one operator may be the resource availability information of the part of operators in the at least one operator.

For example, it is assumed that the identifier of the at least one operator and/or the identifier of the operator management instance include/includes: the first identifier of the first operator and/or the identifier of the first operator management instance, and the second identifier of the second operator and/or the identifier of the second operator management instance. The sixth message may include only the first resource availability information of the first operator and does not include the second resource availability information of the second operator, or the sixth message may include only the second resource availability information of the second operator and does not include the first resource availability information of the first operator.

Optionally, the sixth message further includes the identifier of the at least one operator and/or the identifier of the operator management instance.

For example, the sixth message further includes the first identifier of the first operator and/or the identifier of the first operator management instance, and the second identifier of the second operator and/or the identifier of the second operator management instance.

S1203: The first management unit configures the resource availability information in the operator management instance.

For example, the first management unit may configure the first resource availability information in the first operator management instance, and configure the second resource availability information in the second operator management instance. Similarly, the first management unit may configure corresponding resource availability information in another operator management instance. Details are not listed one by one in this application.

Based on the access network management configuration method shown in FIG. 12, in a network maintenance phase, the management unit of the first operator may determine resource availability information of each operator, and the resource availability information of each operator may be different, so that differentiated configuration requirements between a plurality of operators or between an operator and an enterprise can be met.

Figure 13:
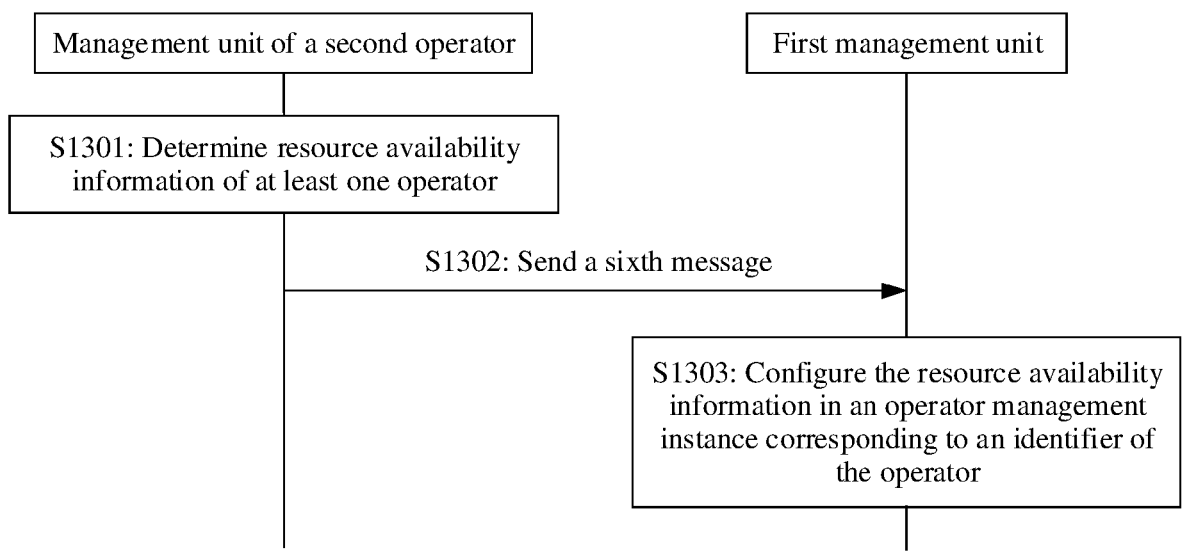
FIG. 13 is a schematic flowchart 3 of an access network management configuration method according to an embodiment of this application.

FIG. 13 is a schematic flowchart 3 of an access network management configuration method according to an embodiment of this application.

In a possible design solution, the access network management configuration method provided in this embodiment of this application may further include the following S1301 to S1303.

S1301: A management unit of a second operator may determine resource availability information of at least one operator.

For example, the at least one operator may include the second operator and/or at least one external operator associated with the second operator.

For a specific implementation of the resource availability information and the resource, refer to S1201. Details are not described herein again.

S1302: The management unit of the second operator sends a sixth message to a first management unit. Correspondingly, the first management unit receives the sixth message from the management unit of the second operator.

For a specific implementation of the sixth message, refer to S1202. Details are not described herein again.

S1303: The first management unit configures the resource availability information in an operator management instance corresponding to an identifier of the operator.

For example, the first management unit may configure, in a second operator management instance, resource availability information corresponding to a second identifier of the second operator, and configure, in an external operator management instance 1, resource availability information corresponding to an identifier of an external operator 1. Similarly, the first management unit may configure corresponding resource availability information in another operator management instance. Details are not listed one by one in this application.

Based on the access network management configuration method shown in FIG. 13, in a network maintenance phase, the management unit of the second operator may independently determine the resource availability information of the second operator. The resource availability information may be different from resource availability information of another operator, so that differentiated configuration requirements between a plurality of operators or between an operator and an enterprise can be met.

Figure 14:
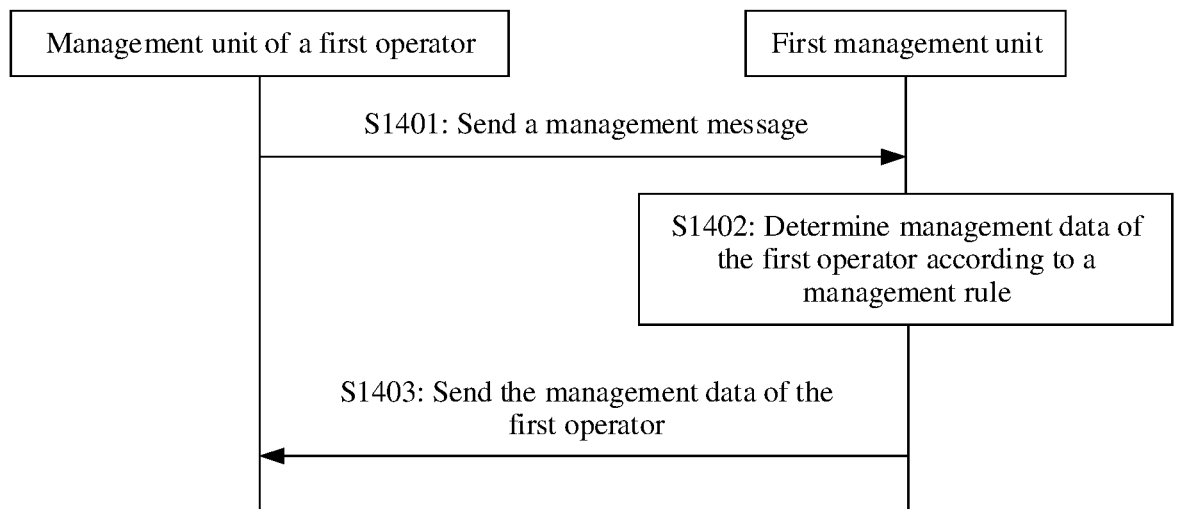
FIG. 14 is a schematic flowchart 4 of an access network management configuration method according to an embodiment of this application.

FIG. 14 is a schematic flowchart 4 of an access network management configuration method according to an embodiment of this application.

In a possible design solution, the access network management configuration method provided in this embodiment of this application may further include the following S1401 to S1403.

S1401: A management unit of a first operator sends a management message to a first management unit. Correspondingly, the first management unit receives the management message from the management unit of the first operator.

Optionally, the management message may include a management rule of management data.

For example, the management data may include one or more of the following: a spectrum resource, a resource block (resource block, RB) resource, a quantity of radio resource control (radio resource control, RRC) connected terminal devices, or a data radio bearer (data radio bearer, DRB) resource.

Optionally, the management rule may include one or more of the following: operator granularity statistics indication information, an identifier of at least one operator, an identifier of at least one operator management instance, and at least one management data receiver address.

The identifier of the at least one operator may include a first identifier of the first operator, and/or an identifier of at least one second operator, and/or an identifier of at least one external operator. The identifier of the at least one second operator may include a second identifier. The identifier of the at least one operator management instance may include an identifier of a first operator management instance, and/or an identifier of a second operator management instance, and/or an identifier of at least one external operator management instance. In other words, the management unit of the first operator may subscribe to management data related to the first operator, or may subscribe to management data of another operator, such as a second operator or an external operator.

For example, the operator granularity statistics indication information may indicate to collect statistics on and report all management data based on an operator granularity.

For example, assuming that the identifier of the at least one operator includes the first identifier of the first operator and the second identifier of the second operator, the operator granularity statistics indication information may indicate to separately collect statistics on and report, based on the first operator and the second operator, each item of data included in the management data.

For another example, the operator granularity statistics indication information may indicate to collect statistics on and report a part of management data based on an operator granularity.

For example, assuming that the identifier of the at least one operator includes the first identifier of the first operator and the second identifier of the second operator, the operator granularity statistics indication information may indicate to collect statistics on and report management data of the spectrum resource and the RB resource based on the first operator and the second operator, and directly collect statistics on and report other management data without collecting statistics on and reporting the other management data based on the operator granularity.

Optionally, management data receiver address is associated with an identifier of an operator, and may indicate a management data receiver address of the operator corresponding to the identifier of the operator. The management data receiver address may be a file receiver address or a stream receiver address.

In some embodiments, the at least one management data receiver address may include management data receiver addresses of operators corresponding to identifiers of all the operators in the identifier of the at least one operator, and the at least one management data receiver address may be in a one-to-one correspondence with the identifier of the at least one operator.

In other words, the at least one management data receiver address may be the management data receiver addresses of all the operators in the at least one operator.

For example, assuming that the identifier of the at least one operator includes: the first identifier of the first operator and the second identifier of the second operator, the at least one management data receiver address includes a management data receiver address of the first operator and a management data receiver address of the second operator.

In some other embodiments, the at least one management data receiver address may include management data receiver addresses of operators corresponding to identifiers of the part of operators in the identifier of the at least one operator.

In other words, the at least one management data receiver address may be the management data receiver addresses of the part of operators in the at least one operator.

For example, assuming that the identifier of the at least one operator includes: the first identifier of the first operator and the second identifier of the second operator, the at least one management data receiver address may include only the management data receiver address of the first operator and not include the management data receiver address of the second operator.

S1402: The first management unit determines the management data of the first operator according to the management rule.

Optionally, the first management unit may periodically determine, according to the management rule, management data of the operator corresponding to the identifier of the at least one operator.

For example, the first management unit may determine the management data of the first operator and/or management data of the second operator according to the management rule, and may further determine management data of another operator. Details are not listed one by one in this application.

In some embodiments, before the first management unit may periodically determine, according to the management rule, the management data of the operator corresponding to the identifier of the at least one operator, the method may further include: The management unit of the first operator sends a query request to the first management unit. Correspondingly, the first management unit receives the query request from the management unit of the first operator, and/or a management unit of the second operator sends the query request to the first management unit. Correspondingly, the first management unit receives the query request from the management unit of the second operator.

In other words, after receiving the query request, the first management unit may determine, according to the management rule, the management data of the operator corresponding to the identifier of the operator, where the query request may be sent by an operator corresponding to an identifier of any operator in the identifier of the at least one operator.

S1403: The first management unit sends the management data of the first operator to the management unit of the first operator. Correspondingly, the management unit of the first operator receives the management data of the first operator from the first management unit.

For example, the first management unit may periodically send the management data of the first operator to the management unit of the first operator.

For another example, after receiving the query request sent by the management unit of the first operator, the first management unit may send the management data of the first operator to the management unit of the first operator.

In other words, the first management unit may periodically report the management data to the management unit of the operator, or may report the management data after receiving the query request.

Optionally, the first management unit may send the management data of the second operator to the management unit of the second operator. Correspondingly, the management unit of the second operator may receive the management data of the second operator from the first management unit.

For example, the first management unit may periodically send the management data of the second operator to the management unit of the second operator.

For another example, after receiving the query request sent by the management unit of the second operator, the first management unit may send the management data of the second operator to the management unit of the second operator.

Optionally, the first management unit may send the management data of the operator corresponding to the identifier of the operator to a management data receiver address of the at least one operator. Correspondingly, a management unit of the at least one operator may receive the management data from the first management unit by using the management data receiver address of the operator.

For example, the first management unit may send the management data of the first operator to the management data receiver address of the first operator. Correspondingly, the management unit of the first operator may receive the management data of the first operator from the first management unit by using the management data receiver address of the first operator.

For another example, the first management unit may send the management data of the second operator to the management data receiver address of the second operator. Correspondingly, the management unit of the second operator may receive the management data of the second operator from the first management unit by using the management data receiver address of the second operator.

In other words, the first management unit may send the management data to a management unit of each operator by using a management data receiver address of an operator corresponding to an identifier of each operator.

Based on the access network management configuration method shown in FIG. 14, in a network monitoring phase, the management unit of the first operator may determine a capability of obtaining management data of each operator, so that differentiated requirements between a plurality of operators or between an operator and an enterprise can be met.

Figure 15:
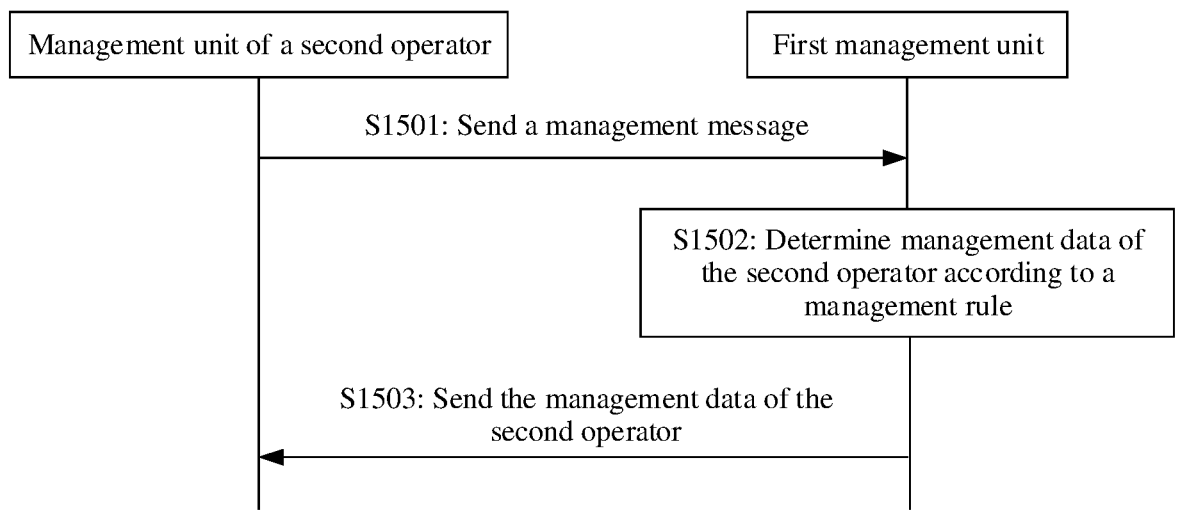
FIG. 15 is a schematic flowchart 5 of an access network management configuration method according to an embodiment of this application.

FIG. 15 is a schematic flowchart 5 of an access network management configuration method according to an embodiment of this application.

In a possible design solution, the access network management configuration method provided in this embodiment of this application may further include the following S1501 to S1503.

S1501: A management unit of a second operator sends a management message to a first management unit. Correspondingly, the first management unit receives the management message from the management unit of the second operator.

For a specific implementation of the management message, refer to S1401. Details are not described herein again.

An identifier of at least one operator may include a second identifier of the second operator and/or an identifier of at least one external operator associated with the second operator. In other words, the management unit of the second operator may independently subscribe to management data related to the second operator.

S1502: The first management unit determines the management data of the second operator according to a management rule.

Optionally, the first management unit may periodically determine, according to the management rule, management data of the operator corresponding to the identifier of the at least one operator.

For example, the identifier of the at least one operator may include the second identifier of the second operator and/or the identifier of the external operator associated with the second operator, in other words, the first management unit may determine the management data of the second operator and/or management data of the external operator associated with the second operator.

In some embodiments, before the first management unit determines, according to the management rule, the management data of the operator corresponding to the identifier of the at least one operator, the method may further include: The management unit of the second operator sends a query request to the first management unit. Correspondingly, the first management unit receives the query request from the management unit of the second operator.

In other words, after receiving the query request, the first management unit may determine, according to the management rule, the management data of the operator corresponding to the identifier of the operator.

S1503: The first management unit sends the management data of the second operator to the management unit of the second operator. Correspondingly, the management unit of the second operator receives the management data from the first management unit.

For example, the first management unit may periodically send the management data of the second operator to the management unit of the second operator.

For another example, after receiving the query request sent by the management unit of the second operator, the first management unit may send management data of a first operator to the management unit of the second operator.

Optionally, the first management unit may send the management data of the second operator to a management data receiver address of the second operator. Correspondingly, the management unit of the second operator may receive the management data of the second operator from the first management unit by using the management data receiver address of the second operator.

In other words, the first management unit may send the management data of the second operator to the management unit of the second operator by using the management data receiver address corresponding to the second operator.

Based on the access network management configuration method shown in FIG. 15, in a network monitoring phase, the management unit of the second operator may independently determine a capability of obtaining the management data of the second operator, so that differentiated requirements between a plurality of operators or between an operator and an enterprise can be met.

Figure 16:
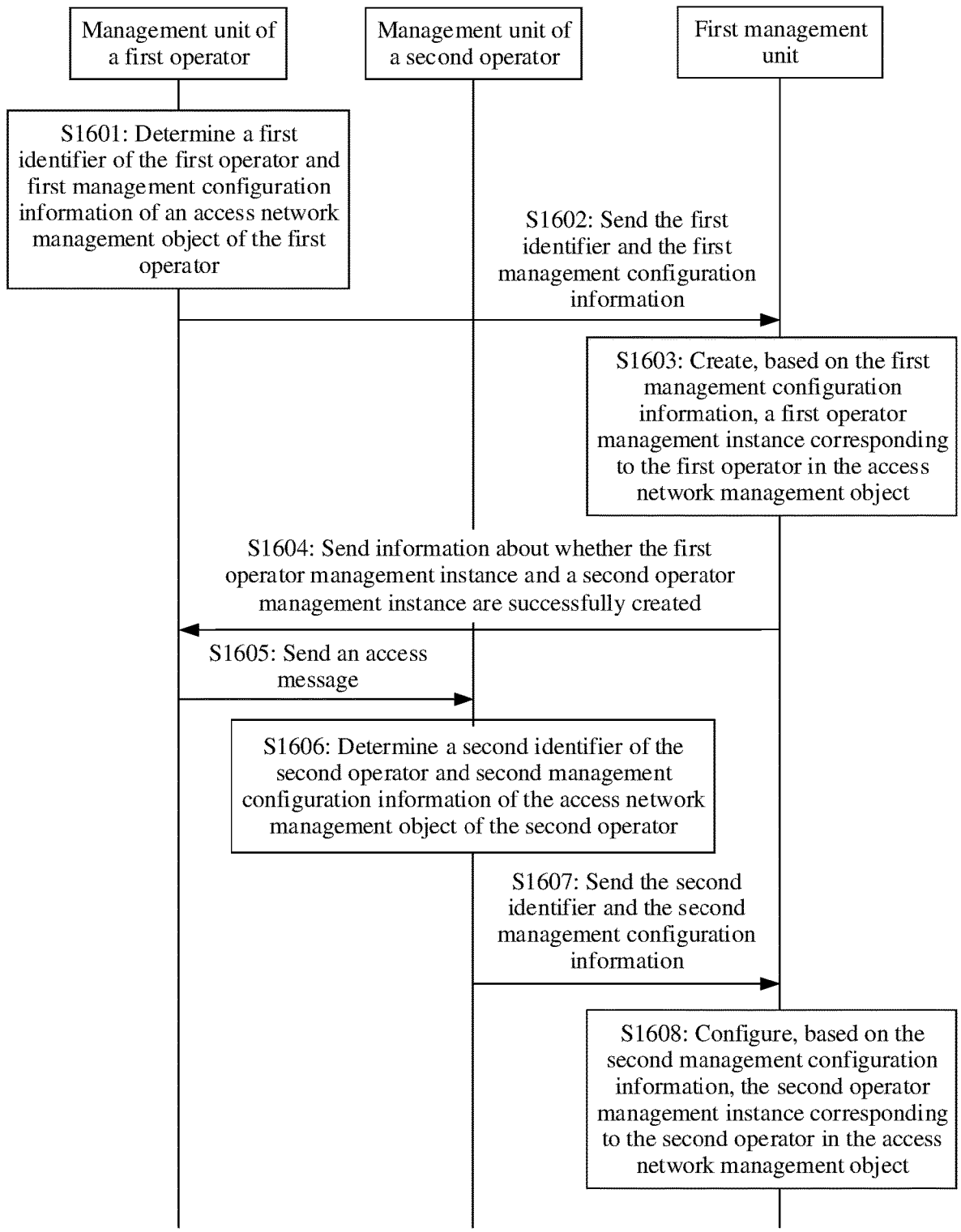
FIG. 16 is a schematic flowchart 6 of an access network management configuration method according to an embodiment of this application.

FIG. 16 is a schematic flowchart 6 of an access network management configuration method according to an embodiment of this application.

As shown in FIG. 16, the access network management configuration method includes the following steps:

S1601: A management unit of a first operator determines a first identifier of the first operator and first management configuration information of an access network management object of the first operator.

Optionally, the management unit of the first operator may determine an identifier of at least one operator and management configuration information of an access network management object of the at least one operator.

For example, the identifier of the at least one operator may include one or more of the following: the first identifier of the first operator, an identifier of at least one second operator, or an identifier of at least one external operator. The identifier of the at least one second operator may include a second identifier of a second operator.

For example, the management configuration information of the access network management object of the at least one operator may include first management configuration information, and management configuration information of an access network management object of the at least one external operator.

In other words, the management unit of the first operator may not determine the second management configuration information of the access network management object of the second operator.

For specific implementations of the management configuration information, the identifier of the at least one operator, and the access network management object, refer to S301. Details are not described herein again.

S1602: The management unit of the first operator sends the first identifier and the first management configuration information to a first management unit. Correspondingly, the first management unit obtains the first identifier and the first management configuration information.

In a possible design solution, S1602 may include: The management unit of the first operator sends a first request to the first management unit. Correspondingly, the first management unit receives the first request from the management unit of the first operator.

Optionally, the first request may carry the first identifier and the first management configuration information.

In some embodiments, the first request may carry the identifier of the at least one second operator, the identifier of the at least one external operator, and the management configuration information of the access network management object of the at least one external operator.

In some embodiments, the first request may carry an identifier of an access network management object and configuration information of the access network management object.

For a specific implementation of the identifier of the access network management object and the configuration information of the access network management object, refer to S303. Details are not described herein again.

S1603: The first management unit creates, based on the first management configuration information, a first operator management instance corresponding to the first operator in the access network management object.

For a specific meaning of creating the operator management instance, refer to S305. Details are not described herein again.

For a specific implementation in which the first management unit creates the first operator management instance corresponding to the first operator in the access network management object, refer to the examples shown in FIG. 5 to FIG. 8 in S305. Details are not described herein again. For a specific implementation in which the first management unit creates only a second operator management instance corresponding to the second operator in the access network management object, refer to the examples shown in FIG. 5 to FIG. 8 in S305. Details are not described herein again.

In other words, in S1603, the first management unit may create only the second operator management instance, and does not configure the second management configuration information in the second operator management instance.

For a specific implementation in which the first management unit creates an external operator management instance corresponding to the external operator in the access network management object, refer to the examples shown in FIG. 9 to FIG. 11 in S305. Details are not described herein again.

For a specific implementation in which the first management unit may select, based on the identifier of the operator, the created operator management instance in the access network management object, refer to the corresponding description in S305. Details are not described herein again.

S1604: The first management unit sends, to the management unit of the first operator, information about whether the first operator management instance and the second operator management instance are successfully created.

In a possible design solution, the first management unit may send a first message to the management unit of the first operator. Correspondingly, the management unit of the first operator may receive the first message from the first management unit.

In another possible design solution, the first management unit may send a second message and a third message to the management unit of the first operator. Correspondingly, the management unit of the first operator may receive the second message and the third message from the first management unit.

For specific implementations of the first message, the second message, and the third message, refer to S305. Details are not described herein again.

S1605: The management unit of the first operator may send an access message to the management unit of the second operator. Correspondingly, the management unit of the second operator may receive the access message from the management unit of the first operator.

For a specific implementation of the access message, refer to S305. Details are not described herein again.

S1606: The management unit of the second operator determines the second identifier of the second operator and the second management configuration information of the access network management object of the second operator.

For a specific implementation of S1606, refer to S302. Details are not described herein again.

S1607: The management unit of the second operator sends the second identifier and the second management configuration information to the first management unit. Correspondingly, the first management unit obtains the second identifier and the second management configuration information.

For a specific implementation of S1607, refer to S304. Details are not described herein again.

S1608: The first management unit configures, based on the second management configuration information, the second operator management instance corresponding to the second operator in the access network management object.

For a specific implementation in which the first management unit configures, based on the second management configuration information, the second operator management instance corresponding to the second operator in the access network management object, refer to the examples shown in FIG. 5 to FIG. 8. Details are not described herein again.

Based on the access network management configuration method shown in FIG. 16, the first management unit may first create and configure the first operator management instance corresponding to the first operator in the access network management object, create only the second operator management instance corresponding to the second operator, and then configure the second operator management instance corresponding to the second operator based on the second management configuration information. The created first operator management instance may be different from the second operator management instance. Differentiated configuration requirements between different operators or between an operator and an enterprise can be met, to improve flexibility of network configuration.

Figure 17:
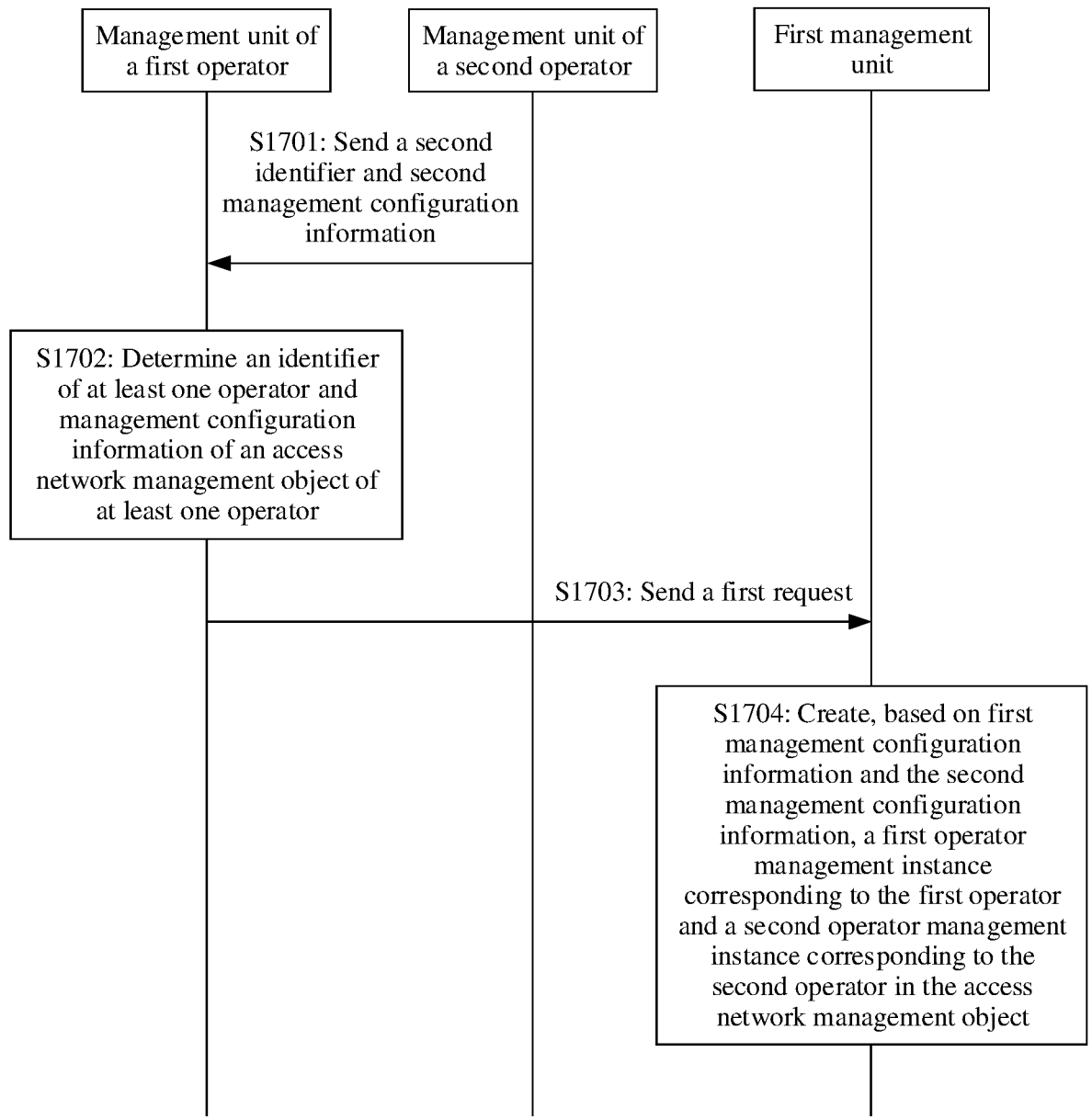
FIG. 17 is a schematic flowchart 7 of an access network management configuration method according to an embodiment of this application.

FIG. 17 is a schematic flowchart 7 of an access network management configuration method according to an embodiment of this application.

As shown in FIG. 17, the access network management configuration method includes the following steps:

S1701: A management unit of a second operator sends a second identifier and second management configuration information to a management unit of a first operator. Correspondingly, the management unit of the first operator receives the second identifier and the second management configuration information from the management unit of the second operator.

S1702: The management unit of the first operator determines an identifier of at least one operator and management configuration information of an access network management object of the at least one operator.

For a specific implementation of S1702, refer to the specific implementation in which the management unit of the first operator may determine the identifier of the at least one operator and the management configuration information of the access network management object of the at least one operator in S301. Details are not described herein again.

S1703: The management unit of the first operator sends a first request to a first management unit. Correspondingly, the first management unit receives the first request from the management unit of the first operator.

Optionally, the first request may carry a first identifier, first management configuration information, the second identifier, and the second management configuration information.

In other words, the management unit of the first operator may request the first management unit to create a first operator management instance corresponding to the first operator and a second operator management instance corresponding to the second operator.

In some embodiments, the first request may carry an identifier of an access network management object and configuration information of the access network management object.

In other words, the management unit of the first operator may request the first management unit to create an access network management object.

For a specific implementation of the identifier of the access network management object and the configuration information of the access network management object, refer to S303. Details are not described herein again.

S1704: The first management unit creates, based on the first management configuration information and the second management configuration information, the first operator management instance corresponding to the first operator and the second operator management instance corresponding to the second operator in the access network management object.

For a specific implementation of S1704, refer to S305. Details are not described herein again.

Based on the access network management configuration method shown in FIG. 17, the first management unit may create, based on the first management configuration information and the second management configuration information, the first operator management instance corresponding to the first operator and the second operator management instance corresponding to the second operator in the access network management object. The created first operator management instance may be different from the second operator management instance. Differentiated configuration requirements between different operators or between an operator and an enterprise can be met, to improve flexibility of network configuration.

Figure 18:
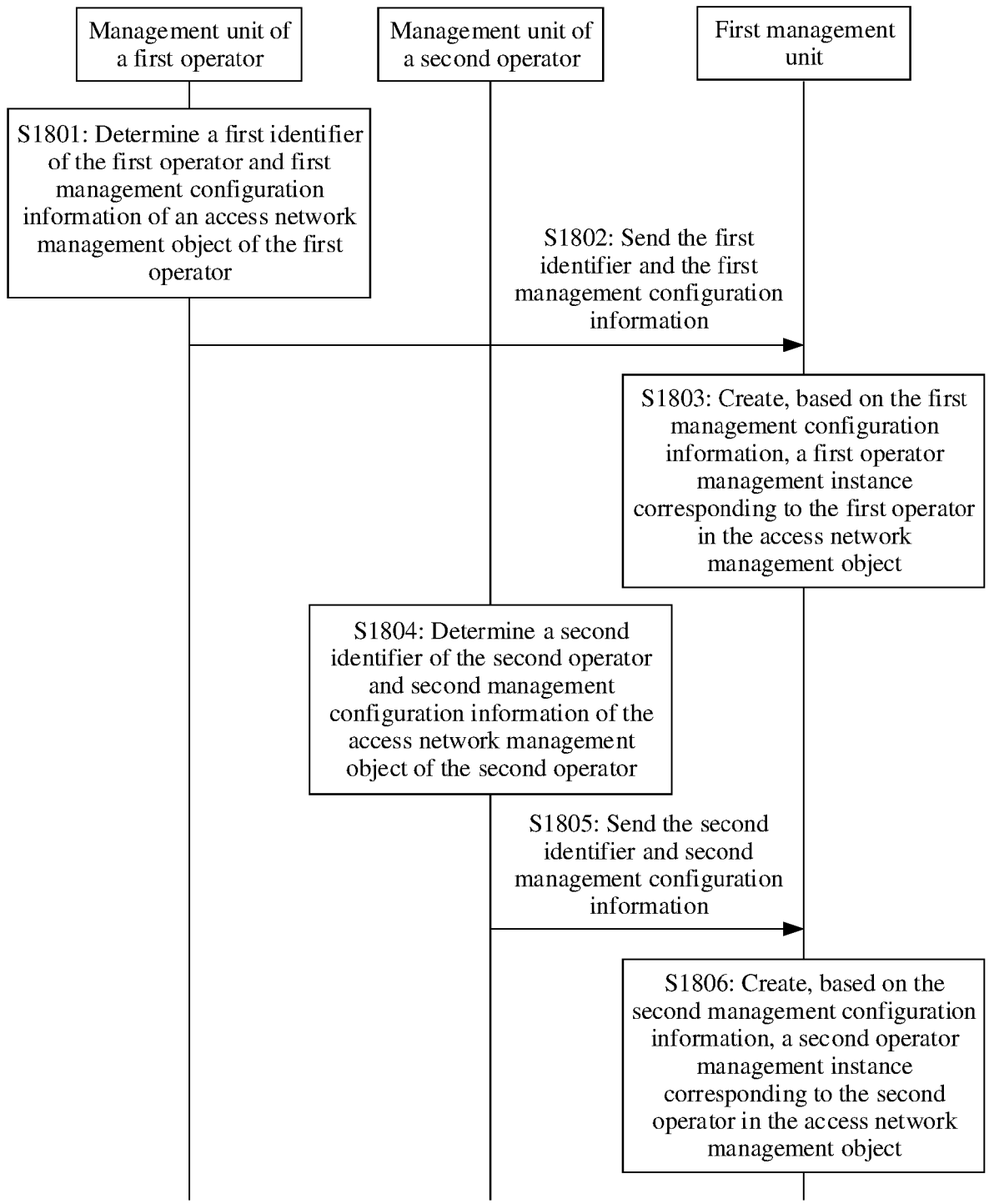
FIG. 18 is a schematic flowchart 8 of an access network management configuration method according to an embodiment of this application.

FIG. 18 is a schematic flowchart 8 of an access network management configuration method according to an embodiment of this application.

As shown in FIG. 18, the access network management configuration method includes the following steps:

S1801: A management unit of a first operator determines a first identifier of the first operator and first management configuration information of an access network management object of the first operator.

For a specific implementation of S1801, refer to S301. Details are not described herein again.

S1802: The management unit of the first operator sends the first identifier and the first management configuration information to a first management unit. Correspondingly, the first management unit obtains the first identifier and the first management configuration information.

For a specific implementation of S1802, refer to S303. Details are not described herein again.

S1803: The first management unit creates, based on the first management configuration information, a first operator management instance corresponding to the first operator in the access network management object.

For a specific meaning of creating the operator management instance, refer to S305. Details are not described herein again.

For a specific implementation in which the first management unit creates the first operator management instance corresponding to the first operator in the access network management object, refer to the examples shown in FIG. 5 to FIG. 8 in S305. Details are not described herein again.

It is assumed that an external operator associated with the first operator is an external operator 1. For a specific implementation in which the first management unit creates an external operator management instance 1 corresponding to the external operator 1 in the access network management object, refer to the examples shown in FIG. 9 to FIG. 11 in S305. Details are not described herein again.

S1804: A management unit of the second operator determines a second identifier of the second operator and second management configuration information of the access network management object of the second operator.

For a specific implementation of S1804, refer to S302. Details are not described herein again.

S1805: The management unit of the second operator sends the second identifier and the second management configuration information to the first management unit. Correspondingly, the first management unit obtains the second identifier and the second management configuration information.

For a specific implementation of S1805, refer to S304. Details are not described herein again.

S1806: The first management unit creates, based on the second management configuration information, a second operator management instance corresponding to the second operator in the access network management object.

For a specific implementation in which the first management unit creates the second operator management instance corresponding to the second operator in the access network management object, refer to the examples shown in FIG. 5 to FIG. 8 in S305. Details are not described herein again.

It is assumed that an external operator associated with the second operator is an external operator 2. For a specific implementation in which the first management unit creates an external operator management instance 2 corresponding to the external operator 2 in the access network management object, refer to the examples shown in FIG. 9 to FIG. 11 in S305. Details are not described herein again.

It should be noted that a sequence of S1801 to S1803 and S1804 to S1806 is not limited in this application.

Based on the access network management configuration method shown in FIG. 18, the first management unit may create, based on a request of the management unit of the first operator, the first operator management instance corresponding to the first operator in the access network management object, and create, based on a request of the management unit of the second operator, the second operator management instance corresponding to the second operator in the access network management object. The created first operator management instance may be different from the second operator management instance. Differentiated configuration requirements between different operators or between an operator and an enterprise can be met, to improve flexibility of network configuration.

The foregoing describes in detail the access network management configuration method provided in embodiments of this application with reference to FIG. 3 to FIG. 18. The following describes in detail management apparatuses provided in embodiments of this application with reference to FIG. 19 to FIG. 21.

Figure 19:
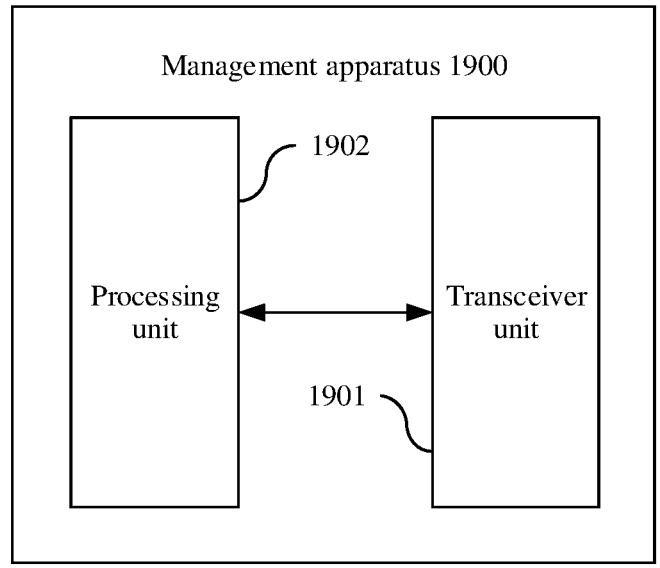
FIG. 19 is a schematic diagram 2 of a structure of a management apparatus according to an embodiment of this application.

FIG. 19 is a schematic diagram 2 of a structure of a management apparatus according to an embodiment of this application. The management apparatus may be used in the communication system shown in FIG. 1, and perform a function of the first management unit in the access network management configuration method shown in FIG. 3 and FIG. 12 to FIG. 18. For ease of description, FIG. 19 shows only main components of the management apparatus.

As shown in FIG. 19, the management apparatus 1900 includes: a transceiver unit 1901 and a processing unit 1902.

The transceiver unit 1901 is configured to obtain a first identifier of a first operator and first management configuration information of an access network management object of the first operator.

The transceiver unit 1901 is further configured to obtain a second identifier of a second operator and second management configuration information of the access network management object of the second operator.

The processing unit 1902 is configured to create, based on the first management configuration information and the second management configuration information, a first operator management instance corresponding to the first operator and a second operator management instance corresponding to the second operator in the access network management object.

In a possible design solution, either of the first management configuration information and the second management configuration information may include one or more of the following: a cell identifier, a tracking area, a 5QI configuration parameter, a slice configuration parameter, a service configuration parameter, a core network configuration parameter, a frequency parameter, a neighboring cell parameter, a neighboring frequency parameter, and a private network configuration parameter.

In a possible design solution, the slice configuration parameter may include network slice selection assistance information and/or a slice resource usage policy. The service configuration parameter may include one or more of the following: a service type, a service feature, and UE group information. The core network configuration parameter may include information about an access and mobility management function and/or user plane function information. The frequency parameter may include one or more of the following: uplink and downlink frequencies, frequency bandwidth, and a carrier spacing. The neighboring cell parameter includes at least one neighboring cell identifier and/or a handover parameter.

In a possible design solution, either of the first management configuration information and the second management configuration information may include operator indication information. The operator indication information may indicate that the operator is a primary operator, a secondary operator, or a private network enterprise. The primary operator is an operator that provides an access network corresponding to the access network management object, the secondary operator is an operator that uses an access network, and the private network enterprise is an enterprise that provides the access network or an enterprise that uses the access network.

In a possible design solution, the access network management object may include one or more of the following: a subnetwork object, a network element object, a network function object, and a cell object.

In a possible design solution, the transceiver unit 1901 is further configured to receive a first request from a management unit of the first operator, where the first request may carry the first identifier and the first management configuration information.

Optionally, the first request may carry a second identifier and second management configuration information.

In a possible design solution, the transceiver unit 1901 is further configured to receive a second request from the management unit of the first operator, where the second request may carry the second identifier and the second management configuration information.

In a possible design solution, the transceiver unit 1901 is further configured to receive a third request from a management unit of the second operator, where the third request may carry the second identifier and the second management configuration information.

In a possible design solution, the transceiver unit 1901 is further configured to send a first message to the management unit of the first operator, where the first message may indicate whether the first operator management instance and the second operator management instance are successfully created.

In a possible design solution, the transceiver unit 1901 is further configured to send a second message and a third message to the management unit of the first operator, where the second message may indicate whether the first operator management instance is successfully created, and the third message may indicate whether the second operator management instance is successfully created.

In a possible design solution, the transceiver unit 1901 is further configured to send a fourth message to the management unit of the first operator, where the fourth message may indicate whether the first operator management instance is successfully created.

In a possible design solution, the transceiver unit 1901 is further configured to send a fifth message to the management unit of the second operator, where the fifth message may indicate whether the second operator management instance is successfully created.

In a possible design solution, the transceiver unit 1901 is further configured to receive a sixth message. The sixth message may include second resource availability information of the second operator, and the second resource availability information indicates a quantity or a proportion of access network resources that can be used by the second operator. The processing unit 1902 is further configured to configure the second resource availability information in the second operator management instance.

In a possible design solution, the transceiver unit 1901 is further configured to receive a management message. The management message may include a management rule of management data, and the management rule may include one or more of the following: operator granularity statistics indication information, the second identifier of the second operator, and a management data receiver address of the second operator.

In a possible design solution, the processing unit 1902 is further configured to determine the management data of the second operator according to the management rule. The transceiver unit 1901 is further configured to send the management data of the second operator to the management data receiver address of the second operator.

It should be noted that the transceiver unit 1901 may include a receiving unit and a sending unit (not shown in FIG. 19). The receiving unit is configured to receive data and/or signaling from the management unit of the first operator and the management unit of the second operator. The sending unit is configured to send data and/or signaling to the management unit of the first operator and the management unit of the second operator. A specific implementation of the transceiver unit 1901 is not specifically limited in this application.

Optionally, the management apparatus 1900 may further include a storage unit (not shown in FIG. 19), and the storage unit stores a program or instructions. When the processing unit 1902 executes the program or the instructions, the management apparatus 1900 may perform a function of the first management unit in the access network management configuration method shown in the foregoing embodiments.

It should be noted that the management apparatus 1900 may be the RAN management unit shown in FIG. 1 or the management apparatus 200 shown in FIG. 2, or may be a chip (a system) or another part or component that can be disposed in the RAN management unit. This is not limited in this application.

In addition, for a technical effect of the management apparatus 1900, refer to the technical effects of the access network management configuration method shown in FIG. 3 and FIG. 12 to FIG. 18. Details are not described herein again.

Figure 20:
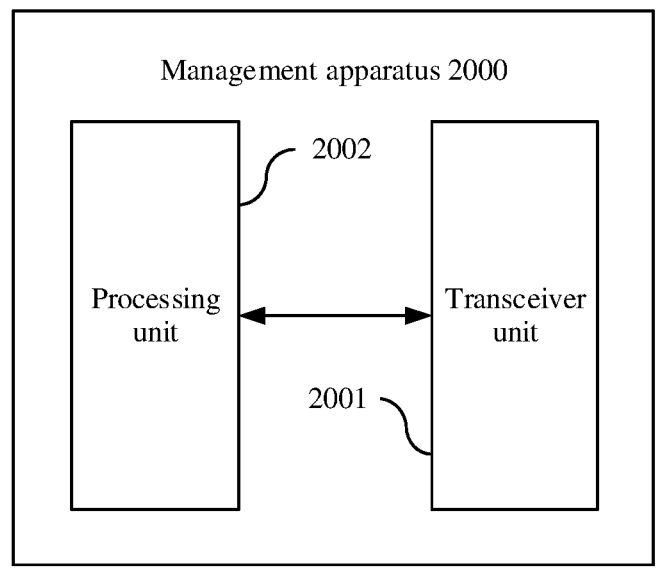
FIG. 20 is a schematic diagram 3 of a structure of a management apparatus according to an embodiment of this application.

FIG. 20 is a schematic diagram 3 of a structure of a management apparatus according to an embodiment of this application. The management apparatus may be used in the communication system shown in FIG. 1, and perform a function of the management unit of the first operator in the access network management configuration method shown in FIG. 3, FIG. 12, FIG. 14, and FIG. 16 to FIG. 18. For ease of description, FIG. 20 shows only main components of the management apparatus.

As shown in FIG. 20, the management apparatus 2000 includes: a transceiver unit 2001 and a processing unit 2002.

The processing unit is configured to determine a first identifier of a first operator and first management configuration information of an access network management object of the first operator.

The transceiver unit is configured to send the first identifier and the first management configuration information to a first management unit, to enable creation of a first operator management instance corresponding to the first operator in the access network management object.

In a possible design solution, the first management configuration information may include one or more of the following: a cell identifier, a tracking area, a 5QI configuration parameter, a slice configuration parameter, a service configuration parameter, a core network configuration parameter, a frequency parameter, a neighboring cell parameter, a neighboring frequency parameter, and a private network configuration parameter.

In a possible design solution, the slice configuration parameter may include network slice selection assistance information and/or a slice resource usage policy. The service configuration parameter may include one or more of the following: a service type, a service feature, and UE group information. The core network configuration parameter includes information about an access and mobility management function and/or user plane function information. The frequency parameter includes one or more of the following: uplink and downlink frequencies, frequency bandwidth, and a carrier spacing. The neighboring cell parameter includes at least one neighboring cell identifier and/or a handover parameter.

In a possible design solution, the first management configuration information may include operator indication information. The operator indication information indicates that the operator is a primary operator, a secondary operator, or a private network enterprise. The primary operator is an operator that provides an access network corresponding to the access network management object, the secondary operator is an operator that uses the access network, and the private network enterprise is an enterprise that provides the access network or an enterprise that uses the access network.

In a possible design solution, the access network management object includes one or more of the following: a subnetwork object, a network element object, a network function object, and a cell object.

In a possible design solution, the transceiver unit is further configured to send a first request to the first management unit, where the first request carries the first identifier and the first management configuration information.

In a possible design solution, the transceiver unit is further configured to send a second identifier of a second operator and second management configuration information of the access network management object of the second operator to the first management unit, to enable creation of a second operator management instance corresponding to the second operator in the access network management object.

Optionally, the first request carries the second identifier and the second management configuration information.

In a possible design solution, the transceiver unit is further configured to send a second request to the first management unit, where the second request carries the second identifier and the second management configuration information.

In a possible design solution, the transceiver unit is further configured to receive the second identifier and the second management configuration information from a management unit of the second operator.

In a possible design solution, the transceiver unit is further configured to receive a first message from the first management unit, where the first message indicates whether the first operator management instance and the second operator management instance are successfully created.

In a possible design solution, the transceiver unit is further configured to receive a second message and a third message from the first management unit, where the second message indicates whether the first operator management instance is successfully created, and the third message indicates whether the second operator management instance is successfully created.

In a possible design solution, the transceiver unit is further configured to receive a fourth message from the first management unit, where the fourth message indicates whether the first operator management instance is successfully created.

In a possible design solution, the transceiver unit is further configured to send an access message to the management unit of the second operator. The access message includes an identifier and access information of the second operator management instance. The access information includes one or more of the following: an address of the first management unit, an identifier of the first management unit, a uniform resource identifier of the first management unit, and access control information of the first management unit.

In a possible design solution, the processing unit is further configured to determine second resource availability information of the second operator, where the second resource availability information indicates a quantity or a proportion of access network resources that can be used by the second operator. The transceiver unit is further configured to send a sixth message to the first management unit, where the sixth message includes second resource availability information of the second operator.

In a possible design solution, the transceiver unit is further configured to send a management message to the first management unit. The management message includes a management rule of management data, and the management rule includes one or more of the following: operator granularity statistics indication information, the second identifier of the second operator, and a management data receiver address of the second operator.

It should be noted that the transceiver unit 2001 may include a receiving unit and a sending unit (not shown in FIG. 20). The receiving unit is configured to receive data and/or signaling from the first management unit and the management unit of the second operator. The sending unit is configured to send data and/or signaling to the first management unit and the management unit of the second operator. A specific implementation of the transceiver unit 2001 is not specifically limited in this application.

Optionally, the management apparatus 2000 may further include a storage unit (not shown in FIG. 20), and the storage unit stores a program or instructions. When the processing unit 2002 executes the program or the instructions, the management apparatus 2000 may perform a function of the management unit of the first operator in the access network management configuration method shown in the foregoing embodiments.

It should be noted that the management apparatus 2000 may be the management unit of the first operator shown in FIG. 1 or the management apparatus 200 shown in FIG. 2, or may be a chip (a system) or another part or component that can be disposed in the management unit of the first operator. This is not limited in this application.

In addition, for a technical effect of the management apparatus 2000, refer to the technical effects of the access network management configuration method shown in FIG. 3, FIG. 12, FIG. 14, and FIG. 16 to FIG. 18. Details are not described herein again.

Figure 21:
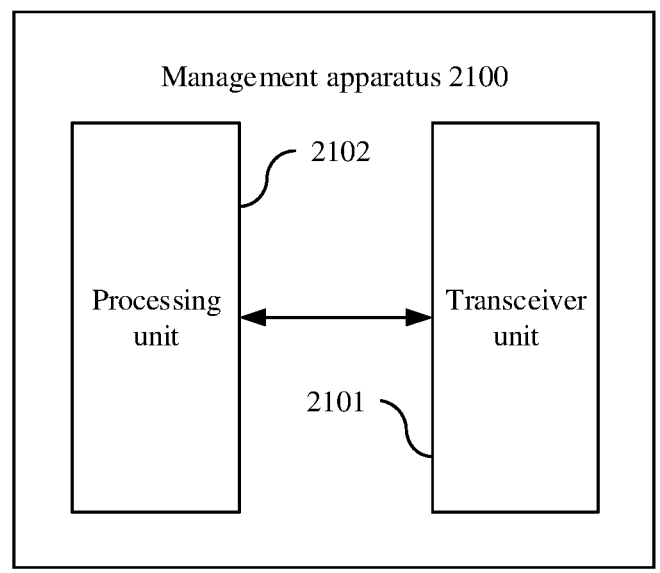
FIG. 21 is a schematic diagram 4 of a structure of a management apparatus according to an embodiment of this application.

FIG. 21 is a schematic diagram 4 of a structure of a management apparatus according to an embodiment of this application. The management apparatus may be used in the communication system shown in FIG. 1, and perform a function of the management unit of the second operator in the access network management configuration method shown in FIG. 3, FIG. 13, FIG. 15, and FIG. 16 to FIG. 18. For ease of description, FIG. 21 shows only main components of the management apparatus.

As shown in FIG. 21, the management apparatus 2100 includes: a transceiver unit 2101 and a processing unit 2102.

The processing unit 2102 is configured to determine a second identifier of a second operator and second management configuration information of an access network management object of the second operator.

The transceiver unit 2101 is configured to send the second identifier and the second management configuration information to a first management unit, to enable creation of a second operator management instance corresponding to the second operator in the access network management object.

In a possible design solution, the second management configuration information may include one or more of the following: a cell identifier, a tracking area, a 5QI configuration parameter, a slice configuration parameter, a service configuration parameter, a core network configuration parameter, a frequency parameter, a neighboring cell parameter, a neighboring frequency parameter, and a private network configuration parameter.

In a possible design solution, the slice configuration parameter includes network slice selection assistance information and/or a slice resource usage policy. The service configuration parameter may include one or more of the following: a service type, a service feature, and UE group information. The core network configuration parameter includes information about an access and mobility management function and/or user plane function information. The frequency parameter includes one or more of the following: uplink and downlink frequencies, frequency bandwidth, and a carrier spacing. The neighboring cell parameter includes at least one neighboring cell identifier and/or a handover parameter.

In a possible design solution, the second management configuration information may include operator indication information. The operator indication information indicates that the operator is a primary operator, a secondary operator, or a private network enterprise. The primary operator is an operator that provides an access network corresponding to the access network management object, the secondary operator is an operator that uses the access network, and the private network enterprise is an enterprise that provides the access network or an enterprise that uses the access network.

In a possible design solution, the access network management object includes one or more of the following: a subnetwork object, a network element object, a network function object, and a cell object.

In a possible design solution, the transceiver unit 2101 is further configured to receive a fifth message from the first management unit, where the fifth message indicates whether the second operator management instance is successfully created.

In a possible design solution, the transceiver unit 2101 is further configured to receive an access message from a management unit of a first operator. The access message includes an identifier and access information of the second operator management instance. The access information includes one or more of the following: an address of the first management unit, an identifier of the first management unit, a uniform resource identifier of the first management unit, and access control information of the first management unit.

In a possible design solution, the processing unit 2102 is further configured to determine second resource availability information of the second operator, where the second resource availability information indicates a quantity or a proportion of access network resources that can be used by the second operator. The transceiver unit 2101 is further configured to send a sixth message to the first management unit, where the sixth message includes second resource availability information of the second operator.

In a possible design solution, the transceiver unit 2101 is further configured to send a management message to the first management unit. The management message includes a management rule of management data, and the management rule includes one or more of the following: operator granularity statistics indication information, the second identifier of the second operator, and a management data receiver address of the second operator. The transceiver unit 2101 is further configured to receive the management data of the second operator from the first management unit.

It should be noted that the transceiver unit 2101 may include a receiving unit and a sending unit (not shown in FIG. 21). The receiving unit is configured to receive data and/or signaling from the first management unit and the management unit of the first operator. The sending unit is configured to send data and/or signaling to the first management unit and the management unit of the first operator. A specific implementation of the transceiver unit 2101 is not specifically limited in this application.

Optionally, the management apparatus 2100 may further include a storage unit (not shown in FIG. 21), and the storage unit stores a program or instructions. When the processing unit 2102 executes the program or the instructions, the management apparatus 2100 may perform a function of the management unit of the second operator in the access network management configuration method shown in the foregoing embodiments.

It should be noted that the management apparatus 2100 may be the management unit of the second operator shown in FIG. 1 or the management apparatus 200 shown in FIG. 2, or may be a chip (a system) or another part or component that can be disposed in the management unit of the second operator. This is not limited in this application.

In addition, for a technical effect of the management apparatus 2100, refer to the technical effects of the access network management configuration method shown in FIG. 3, FIG. 13, FIG. 15, and FIG. 16 to FIG. 18. Details are not described herein again.

An embodiment of this application provides a communication system. The system includes a first management unit, a management unit of a first operator, and a management unit of a second operator.

An embodiment of this application provides a computer-readable storage medium. The computer-readable storage medium includes a computer program or instructions. When the computer program or the instructions are run on a computer, the computer is enabled to perform the access network management configuration method in the foregoing method embodiments.

An embodiment of this application provides a computer program product, including a computer program or instructions. When the computer program or the instructions are run on a computer, the computer is enabled to perform the access network management configuration method in the foregoing method embodiments.

It should be understood that, the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through an example rather than a limitative description, random access memories (random access memories, RAMs) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware (for example, circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated object, and indicates that three relationships may exist. For example, A and/or B may indicate the following three cases: Only A exists, both A and B exist, and only B exists. A and B may be singular or plural. In addition, the character "I" in this specification generally indicates an "or" relationship between associated objects, but may also indicate an "and/or" relationship. For details, refer to the context for understanding.

In this application, at least one means one or more, and a plurality of means two or more. At least one of the following items (pieces) or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An access network management configuration method, comprising:
    obtaining a first identifier of a first operator and first management configuration information of an access network management object of the first operator;
    obtaining a second identifier of a second operator and second management configuration information of the access network management object of the second operator, wherein the access network management object of the first operator and the access network management object of the second operator are one and the same access network management object; and
    creating, based on the first management configuration information and the second management configuration information, a first operator management instance corresponding to the first operator and a second operator management instance corresponding to the second operator in the same access network management object.

2. The method according to claim 1, wherein either of the first management configuration information and the second management configuration information comprises at least one of: a cell identifier, a tracking area, a 5QI configuration parameter, a slice configuration parameter, a service configuration parameter, a core network configuration parameter, a frequency parameter, a neighboring cell parameter, a neighboring frequency parameter, or a private network configuration parameter.

3. The method according to claim 2, wherein
the slice configuration parameter comprises at least one of network slice selection assistance information or a slice resource usage policy; or
the service configuration parameter comprises at least one of: a service type, a service feature, or UE group information; or
the core network configuration parameter comprises at least one of information about an access and mobility management function or user plane function information; or
the frequency parameter comprises at least one of: uplink and downlink frequencies, frequency bandwidth, or a carrier spacing; or
the neighboring cell parameter comprises at least one of a handover parameter or at least one neighboring cell identifier.

4. The method according to claim 1, wherein the access network management object comprises at least one of: a subnetwork object, a network element object, a network function object, or a cell object.

5. The method according to claim 1, wherein the obtaining the first identifier and first management configuration information and the obtaining the second identifier and second management configuration information comprise:
receiving a first request from a management apparatus of the first operator, wherein the first request carries:
the first identifier and the first management configuration information; and
the second identifier and the second management configuration information.

6. A management apparatus, comprising:
at least one processor; and
a memory coupled to the at least one processor and having program instructions stored thereon, the program instructions executable by the at least one processor to cause the apparatus to:
obtain a first identifier of a first operator and first management configuration information of an access network management object of the first operator;
obtain a second identifier of a second operator and second management configuration information of the access network management object of the second operator, wherein the access network management object of the first operator and the access network management object of the second operator are one and the same access network management object; and
create, based on the first management configuration information and the second management configuration information, a first operator management instance corresponding to the first operator and a second operator management instance corresponding to the second operator in the same access network management object.

7. The apparatus according to claim 6, wherein either of the first management configuration information and the second management configuration information comprises at least one of: a cell identifier, a tracking area, a 5QI configuration parameter, a slice configuration parameter, a service configuration parameter, a core network configuration parameter, a frequency parameter, a neighboring cell parameter, a neighboring frequency parameter, or a private network configuration parameter.

8. The apparatus according to claim 7, wherein
the slice configuration parameter comprises at least one of network slice selection assistance information or a slice resource usage policy; or
the service configuration parameter comprises at least one of: a service type, a service feature, or UE group information; or
the core network configuration parameter comprises at least one of information about an access and mobility management function or user plane function information; or
the frequency parameter comprises at least one of: uplink and downlink frequencies, frequency bandwidth, or a carrier spacing; or
the neighboring cell parameter comprises at least one of a handover parameter or at least one neighboring cell identifier.

9. The apparatus according to claim 6, wherein the access network management object comprises at least one of: a subnetwork object, a network element object, a network function object, or a cell object.

10. The apparatus according to claim 6, wherein
the program instructions are executable by the at least one processor to further cause the apparatus to:
receive a first request from a management apparatus of the first operator, wherein the first request carries:
the first identifier and the first management configuration information; and
the second identifier and the second management configuration information.

11. An access network management configuration method, comprising:
sending, by a first management apparatus, a first request to a second management apparatus, wherein the first request carries:
a first identifier of a first operator,
first management configuration information of an access network management object of the first operator,
a second identifier of a second operator, and
second management configuration information of the access network management object of the second operator, wherein the access network management object of the first operator and the access network management object of the second operator are one and the same access network management object;
receiving, by the second management apparatus, the first request; and
creating, by the second management apparatus, based on the first management configuration information and the second management configuration information, a first operator management instance corresponding to the first operator and a second operator management instance corresponding to the second operator in the same access network management object.

12. The method according to claim 11, wherein either of the first management configuration information and the second management configuration information comprises at least one of: a cell identifier, a tracking area, a 5QI configuration parameter, a slice configuration parameter, a service configuration parameter, a core network configuration parameter, a frequency parameter, a neighboring cell parameter, a neighboring frequency parameter, or a private network configuration parameter.

13. The method according to claim 12, wherein
the slice configuration parameter comprises at least one of network slice selection assistance information or a slice resource usage policy; or
the service configuration parameter comprises at least one of: a service type, a service feature, or UE group information; or
the core network configuration parameter comprises at least one of information about an access and mobility management function or user plane function information; or
the frequency parameter comprises at least one of: uplink and downlink frequencies, frequency bandwidth, or a carrier spacing; or
the neighboring cell parameter comprises at least one of a handover parameter or at least one neighboring cell identifier.

14. The method according to claim 11, wherein the access network management object comprises at least one of: a subnetwork object, a network element object, a network function object, or a cell object.

15. The method according to claim 11, wherein, before the sending, by the first management apparatus, the first request to the second management apparatus, the method further comprises:
receiving, by the first management apparatus and from a further management apparatus, the second identifier of the second operator and the second management configuration information of the access network management object; and
determining, by the first management apparatus, the first identifier of the first operator and the first management configuration information of the access network management object.

16. A communication system, wherein the communication system comprises a first management apparatus and a second management apparatus,
wherein the first management apparatus is configured to:
send a first request to the second management apparatus, wherein the first request carries:
a first identifier of a first operator,
first management configuration information of an access network management object of the first operator,
a second identifier of a second operator, and
second management configuration information of the access network management object of the second operator, wherein the access network management object of the first operator and the access network management object of the second operator are one and the same access network management object; and
wherein the second management apparatus is configured to:
receive the first request; and
create, based on the first management configuration information and the second management configuration information, a first operator management instance corresponding to the first operator and a second operator management instance corresponding to the second operator in the same access network management object.

17. The system according to claim 16, wherein either of the first management configuration information and the second management configuration information comprises at least one of: a cell identifier, a tracking area, a 5QI configuration parameter, a slice configuration parameter, a service configuration parameter, a core network configuration parameter, a frequency parameter, a neighboring cell parameter, a neighboring frequency parameter, or a private network configuration parameter.

18. The system according to claim 17, wherein
the slice configuration parameter comprises at least one of network slice selection assistance information or a slice resource usage policy; or
the service configuration parameter comprises at least one of: a service type, a service feature, or UE group information; or
the core network configuration parameter comprises at least one of information about an access and mobility management function or user plane function information; or
the frequency parameter comprises at least one of: uplink and downlink frequencies, frequency bandwidth, or a carrier spacing; or
the neighboring cell parameter comprises at least one of a handover parameter or at least one neighboring cell identifier.

19. The system according to claim 16, wherein the access network management object comprises at least one of: a subnetwork object, a network element object, a network function object, or a cell object.

20. The system according to claim 16, wherein the first management apparatus is further configured to, before sending the first request to the second management apparatus,
receive, from a further management apparatus, the second identifier of the second operator and the second management configuration information of the access network management object; and
determine the first identifier of the first operator and the first management configuration information of the access network management object.

* * * * *